(12) United States Patent
Singh

(10) Patent No.: US 11,797,623 B2
(45) Date of Patent: Oct. 24, 2023

(54) MICROAPP RECOMMENDATIONS FOR NETWORKED APPLICATION FUNCTIONALITY

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 86 days.

(21) Appl. No.: 17/643,445

(22) Filed: Dec. 9, 2021

(65) Prior Publication Data

US 2023/0185864 A1 Jun. 15, 2023

(51) Int. Cl.
*G06F 16/9535* (2019.01)
*G06F 16/2457* (2019.01)
*G06F 16/9538* (2019.01)

(52) U.S. Cl.
CPC .... *G06F 16/9535* (2019.01); *G06F 16/24578* (2019.01); *G06F 16/9538* (2019.01)

(58) Field of Classification Search
CPC ........... G06F 16/9535; G06F 16/24578; G06F 16/9538
See application file for complete search history.

(56) References Cited

U.S. PATENT DOCUMENTS 8,312,450 B2  11/2012  Gangadharappa et al.
9,110,685 B2  8/2015  Suryanarayana et al.
(Continued)

FOREIGN PATENT DOCUMENTS

CN  102054004 A  5/2011
CN  106101250 A  11/2016
(Continued)

OTHER PUBLICATIONS

Notice of Allowance in U.S. Appl. No. 16/850,697 (dated Sep. 8, 2022) (12 pages).
(Continued)

*Primary Examiner* — Jay A Morrison
(74) *Attorney, Agent, or Firm* — FINCH & MALONEY PLLC

(57) ABSTRACT

A method for generating a microapp recommendation comprises receiving, at a client computing device, microapp metadata that characterizes multiple microapps. The method further comprises using a resource access application executing at the client computing device to launch a networked application that displays a user interface. The method further comprises calculating a composite correlation score for a particular microapp. The composite correlation score quantifies correlation between functionality provided by the user interface of the networked application and functionality provided by the particular microapp. The method further comprises using the composite correlation score to make a determination with respect to whether the particular microapp should be recommended to a user of the client computing device. The method further comprises, in response to determining that the particular microapp should be recommended to the user of the client computing device, displaying a supplemental user interface that provides a recommendation for the particular microapp.

25 Claims, 12 Drawing Sheets

(56) References Cited

U.S. PATENT DOCUMENTS

| | | |
|---|---|---|
| 9,280,252 B1 | 3/2016 | Brandmaier et al. |
| 9,405,665 B1 | 8/2016 | Shashi et al. |
| 9,471,624 B1 | 10/2016 | Patil et al. |
| 10,182,103 B2 | 1/2019 | Koushik et al. |
| 10,621,062 B2 | 4/2020 | Ligman et al. |
| 10,817,270 B2 | 10/2020 | Straub et al. |
| 10,848,500 B2 | 11/2020 | Bhattacharya et al. |
| 11,132,179 B1 | 9/2021 | Chu et al. |
| 2005/0268343 A1 | 12/2005 | Onoda et al. |
| 2006/0117059 A1 | 6/2006 | Freeman, Jr. et al. |
| 2011/0047594 A1 | 2/2011 | Mahaffey et al. |
| 2011/0047597 A1 | 2/2011 | Mahaffey et al. |
| 2012/0278736 A1 | 11/2012 | Tran et al. |
| 2013/0227386 A1 | 8/2013 | Ferlin |
| 2013/0251126 A1 | 9/2013 | Hollander et al. |
| 2013/0326499 A1 | 12/2013 | Mowatt et al. |
| 2014/0020068 A1 | 1/2014 | Desai et al. |
| 2014/0026228 A1 | 1/2014 | Isozaki et al. |
| 2014/0149582 A1 | 5/2014 | Chien |
| 2014/0351052 A1 | 11/2014 | Khalsa et al. |
| 2015/0026660 A1 | 1/2015 | Vaidyanathan et al. |
| 2015/0356495 A1 | 12/2015 | Virdi et al. |
| 2016/0085763 A1 | 3/2016 | Tatourian et al. |
| 2016/0234624 A1 | 8/2016 | Riva et al. |
| 2016/0239317 A1 | 8/2016 | Cuddihy et al. |
| 2016/0381118 A1 | 12/2016 | Andrews et al. |
| 2017/0024717 A1 | 1/2017 | Istrati |
| 2017/0212650 A1 | 7/2017 | Sinyagin et al. |
| 2017/0277396 A1 | 9/2017 | Chung et al. |
| 2018/0075513 A1 | 3/2018 | Bastide et al. |
| 2018/0081986 A1 | 3/2018 | Sitik et al. |
| 2018/0189660 A1 | 7/2018 | Malmi et al. |
| 2018/0337951 A1 | 11/2018 | Agarwal et al. |
| 2019/0065177 A1 | 2/2019 | Khoongumjorn et al. |
| 2019/0179884 A1 | 6/2019 | Wooldridge et al. |
| 2019/0324890 A1 | 10/2019 | Li et al. |
| 2019/0370139 A1 | 12/2019 | Vichare et al. |
| 2020/0026502 A1 | 1/2020 | Moore et al. |
| 2020/0090157 A1 | 3/2020 | Khan |
| 2021/0319071 A1 | 10/2021 | Liu et al. |
| 2021/0329081 A1 | 10/2021 | Singh |
| 2023/0115575 A1* | 4/2023 | Tily ............... A61B 5/6801 600/301 |

FOREIGN PATENT DOCUMENTS

| | | |
|---|---|---|
| CN | 106201624 A | 12/2016 |
| CN | 107820701 A | 3/2018 |
| CN | 108268260 A | 7/2018 |
| CN | 109117164 A | 1/2019 |
| CN | 110007986 A | 7/2019 |
| CN | 110069463 A | 7/2019 |
| CN | 110806975 A | 2/2020 |
| WO | 2013156066 A1 | 10/2013 |

OTHER PUBLICATIONS

Lin et al., "An Exploratory Service Composition Approach for Mobile Application", Ruan Jian Xue Bao/Journal of Software, 26(9)12191-2211 (2015) (in Chinese; English translation of abstract only).

"About the MDX Toolkit", retrieved from https://docs.citrix.com/en-us/mdx-toolkit/about-mdx-toolkit.html (Oct. 29, 2019).

"Citrix Insight Services", retrieved from https://docs.citrix.com/en-us/citrix-virtual-apps-desktops/manage-deployment/cis.html (Dec. 18, 2019).

"Citrix Workspace Intelligence—Customer FAQ", retrieved from https://www.citrix.com/content/dam/citrix/en_us/documents/reference-material/citrix-workspace-intelligence-customer-faq.pdf (Oct. 2019).

"Microapps", retrieved from https://docs.citrix.com/en-us/citrix-microapps.html (Jan. 9, 2020).

Miazurowski, "Estimating confidence of individual rating predictions in collaborative filtering recommender systems", Expert Systems with Applications 40, pp. 3847-3857 (2013).

Ruiz, "Citrix Workspace Microapps Service", retrieved from https://docs.citrix.com/en-us/tech-zone/learn/tech-briefs/workspace-microapps.html (Feb. 4, 2020).

Wiffen, "Building a simple Citrix microapp that shows blog posts from a WordPress RSS feed", The Curious Kabri (Blog), retrieved from https://kabri.uk/2019/12/18/building-a-simple-citrix-microapp-that-shows-blog-posts-from-a-wordpress-rss-feed/ (posted Dec. 18, 2019).

Xu, "An Algorithm for Comparing Similarity Between Two Trees", thesis submitted in partial fulfillment of the requirements for the degree of Master of Science in the Department of Computer Science in the Graduate School of Duke University, retrieved from https://arxiv.org/pdf/1508.03381.pdf (submitted Aug. 13, 2015).

Zhu Han; et al., "Learning Tree-based Deep Model for Recommender Systems", Applied Data Science Track Paper, KDD 2018, The 24th ACM SIGKDD International Conference on Knowledge Discovery Data Mining, Aug. 19-23, 2018, 10 pages.

Lu et al., "PRADO: Predicting App Adoption by Learning the Correlation between Developer-Controllable Properties and User Behaviors", Proc. ACM Interact. Mob. Wearable Ubiquitous Technol., 1, 3, Article 79, 30 pages (Sep. 2017).

* cited by examiner

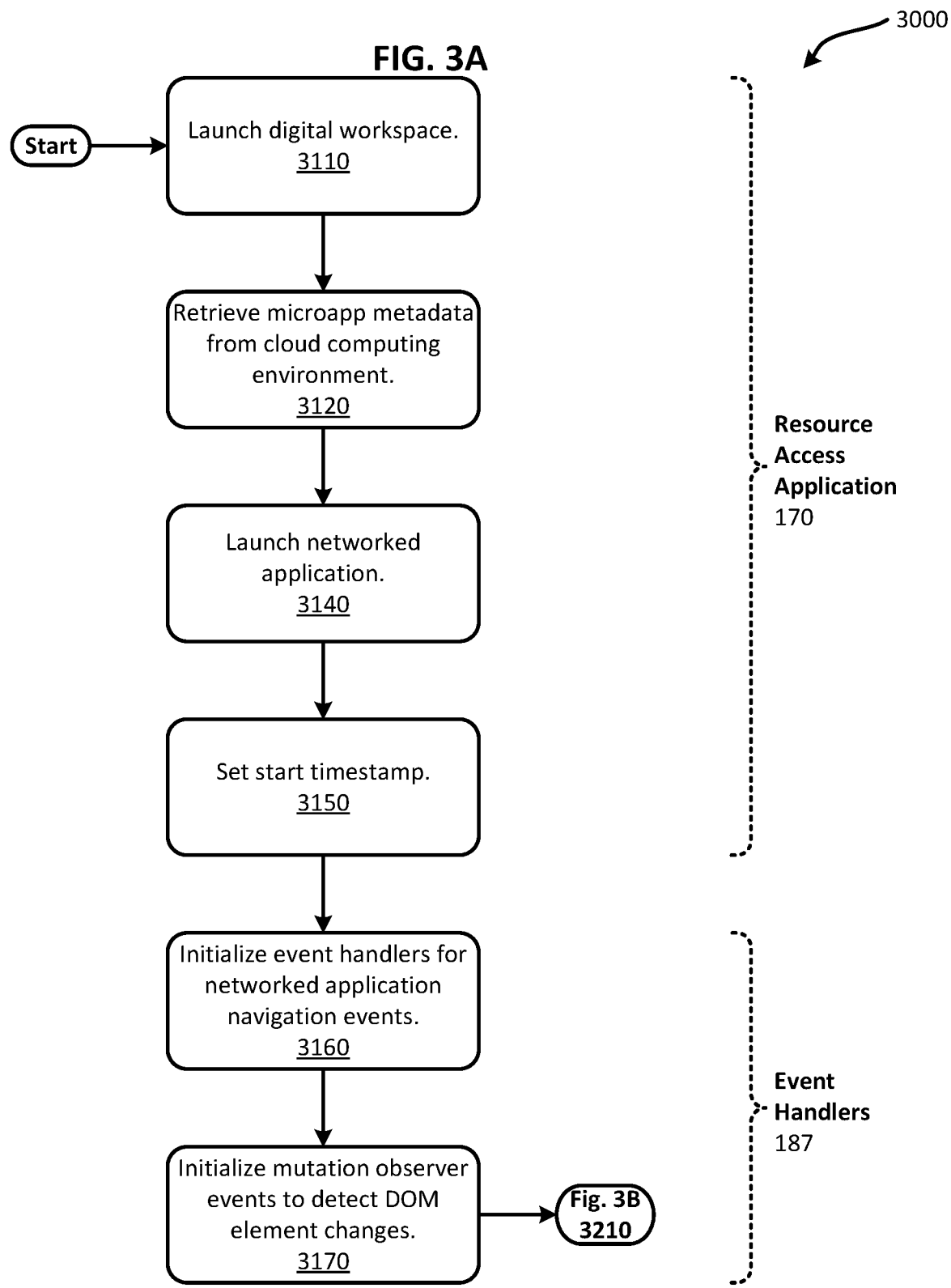

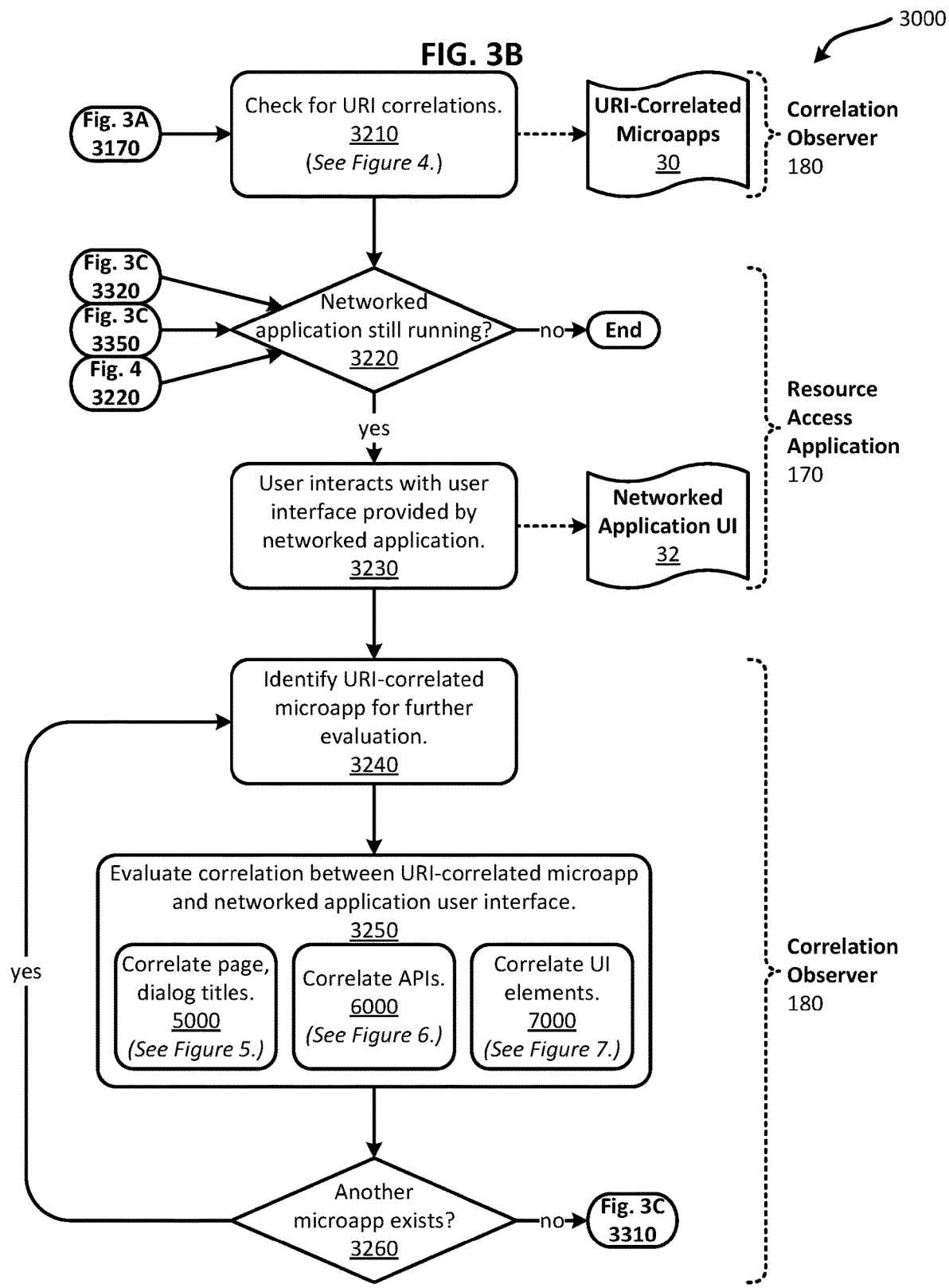

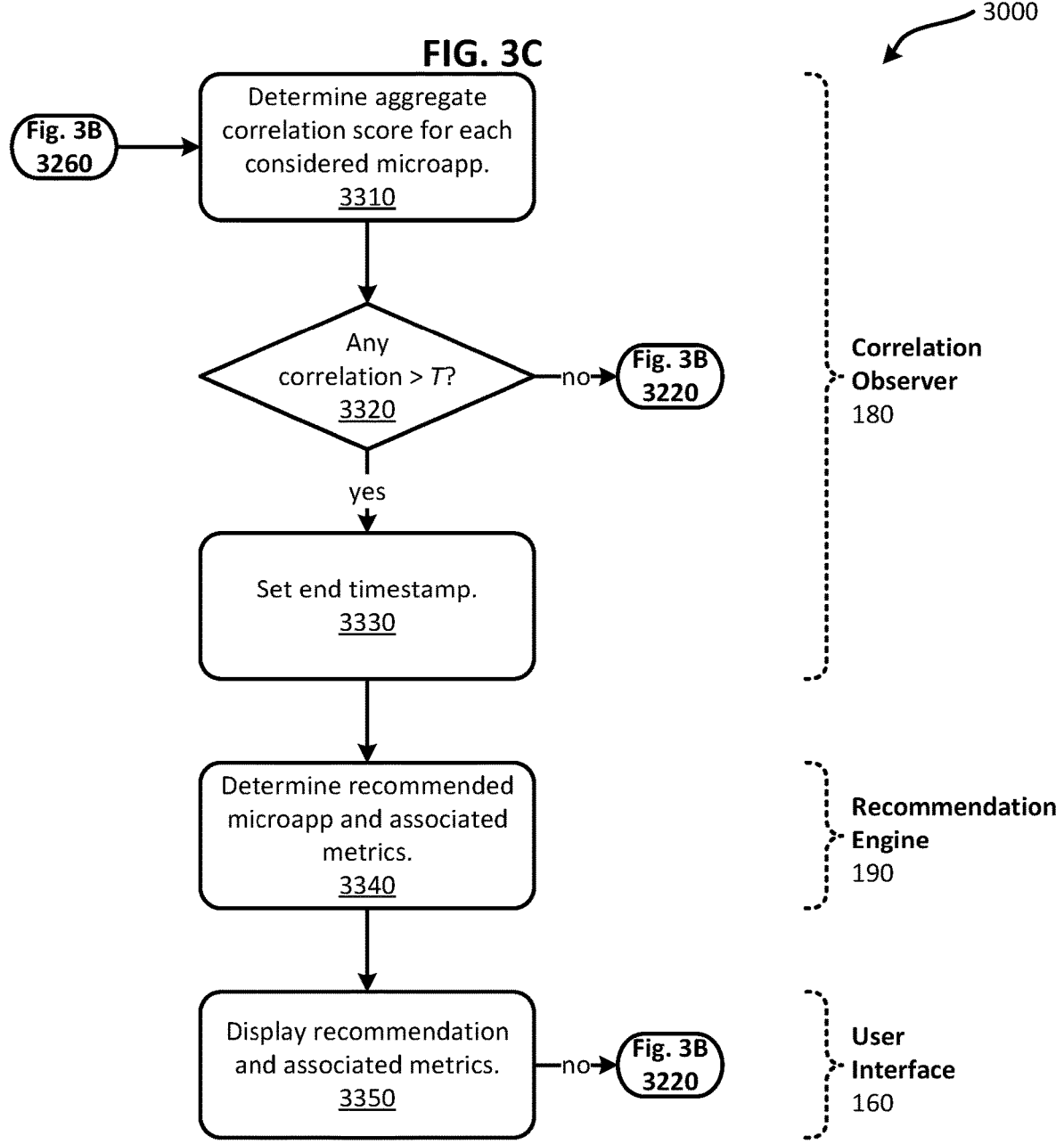

| UI Element | Label | Value Type | Value |
|---|---|---|---|
| 41 | My Time Off Balance | table | -- |
| 42 | Time Off Type | list | † |
| 43 | From | date | -- |
| 44 | To | date | -- |
| 45 | Quantity | numeric | -- |
| 46 | Comment | string | -- |

† = {"Floating Holiday"; "CDI/VOL Time"; "PTO (Paid Time Off Days)"}

FIG. 9

‡ = {"Floating Holiday"; "CDI/VOL Time"; "PTO (Paid Time Off Days)"}

| UI Element | Label | Value Type | Value |
|---|---|---|---|
| 51 | When | string with dates | -- |
| 52 | Type | HTML list | ‡ |
| 53 | Daily Quantity | numeric | -- |
| 54 | Unit of Time | numeric | -- |
| 55 | Comment | string | -- |
| 56 | Attachment | file | -- |

Networked Application User Interface
50

FIG. 10

| UI Element | Label | Value Type | Value |
|---|---|---|---|
| 51 | When | string with dates | -- |
| 52 | *Type* | HTML *list* | ‡ |
| 53 | Daily *Quantity* | *numeric* | -- |
| 54 | Unit of Time | numeric | -- |
| 55 | *Comment* | *string* | -- |
| 56 | Attachment | file | -- |

‡ = {"Floating Holiday"; "CDI/VOL Time"; "PTO (Paid Time Off Days)"}

- 3 matching parameters
- 2 matching parameters
- 2 matching parameters

| UI Element | Label | Value Type | Value |
|---|---|---|---|
| 41 | My Time Off Balance | table | -- |
| 42 | Time Off *Type* | *list* | † |
| 43 | From | date | -- |
| 44 | To | date | -- |
| 45 | *Quantity* | *numeric* | -- |
| 46 | *Comment* | *string* | -- |

† = {"Floating Holiday"; "CDI/VOL Time"; "PTO (Paid Time Off Days)"}

MICROAPP RECOMMENDATIONS FOR NETWORKED APPLICATION FUNCTIONALITY

BACKGROUND

A microapp is a lightweight software application that synchronizes data from one or more complex enterprise applications to provide a user with specific, targeted functionality. Microapps provide this functionality in a streamlined manner via a relatively simple, contained interface. Generally, a user can access the functionality provided by a microapp without needing to launch a new application or toggle to a different application window. Microapps thus allow users to complete simple tasks within the context of an existing application environment, such as a web browser, a digital workspace, or other similar context. Microapps also enable a digital workspace to extend the capabilities of enterprise applications—including "software as a service" (SaaS) applications, web applications, desktop applications, and proprietary applications—through a single interface. In general, a microapp can be used to synchronize data from complex enterprise applications to streamline functionality, and can therefore be understood as a streamlined use case that users can access from within a digital workspace.

SUMMARY

In at least one example, a system is provided. The system comprises a client computing device that includes a memory and at least one processor coupled to the memory. The client computing device is configured to generate a microapp recommendation by a recommendation process. The recommendation process comprises receiving, at the client computing device, microapp metadata that characterizes a plurality of microapps. The recommendation process further comprises using a resource access application executing at the client computing device to launch a networked application that displays a user interface at the client computing device. The recommendation process further comprises calculating a composite correlation score for a particular one of the microapps. The composite correlation score quantifies correlation between functionality provided by the user interface of the networked application and functionality provided by the particular microapp. The recommendation process further comprises using the composite correlation score to make a determination with respect to whether the particular microapp should be recommended to a user of the client computing device. The recommendation process further comprises, in response to determining that the particular microapp should be recommended to the user of the client computing device, displaying a supplemental user interface that provides a recommendation for the particular microapp.

Examples of the system can incorporate one or more of the following features.

In the system, (a) a plurality of composite correlation scores are calculated, each calculated composite correlation score quantifying correlation between functionality provided by the user interface of the networked application and functionality provided by a corresponding one of the microapps; (b) the plurality of composite correlation scores are used to make a determination that more than one microapp should be recommended to the user; and (c) a ranked list of recommended microapps are displayed in the supplemental user interface.

In the system, calculating the composite correlation score for the particular microapp comprises determining a weighted sum of one or more of a title correlation score, an application programming interface (API) correlation score, or a user interface element correlation score.

In system, the recommendation process further comprises (a) determining a first time that the user spends performing a task using the user interface of the networked application; (b) determining a second time associated with performing a corresponding task using the particular microapp; and (c) displaying, in the supplemental user interface, a relative comparison of the first and second times in conjunction with the recommendation of the particular microapp.

In the system, a plurality of composite correlation scores are calculated, each calculated composite correlation score quantifying correlation between functionality provided by the user interface of the networked application and functionality provided by a corresponding one of the micro apps.

In the system, the composite correlation score for the particular microapp depends on a uniform resource identifier (URI) correlation score that is established by a URI correlation score process comprising (a) determining a fully qualified domain name (FQDN) for the networked application; (b) determining a base URI for the particular microapp; (c) setting the URI correlation score to a nonzero value if the FQDN for the networked application corresponds to the base URI of the particular microapp; and (d) setting the URI correlation score to zero if the FQDN for the networked application does not correspond to the base URI of the particular microapp.

In the system, the recommendation process further comprises, in response to setting the URI correlation score to zero, making a determination that the particular microapp should not be recommended to the user of the client computing device.

In the system, the FQDN of the networked application is considered to correspond to the base URI of the particular microapp when at least a portion of the base URI of the particular microapp is included in the FQDN of the networked application.

In the system, the composite correlation score for the particular microapp depends on a title correlation score that is established by a title correlation score process comprising (a) identifying one or more first terms used in a title label associated with the user interface displayed by the networked application; (b) identifying one or more second terms used in an action title label associated with the particular microapp; and (c) incrementing the title correlation score by a first amount in response to at least one of the one or more first terms exactly matching at least one of the one or more second terms.

In the system, the title correlation score process further comprises (a) identifying one or more first synonyms for at least one of the one or more first terms; (b) identifying one or more second synonyms for at least one of the one or more second terms; and (c) incrementing the title correlation score by a second amount in response to one or more of the first synonyms matching one or more of the second synonyms; wherein the first amount is greater than the second amount.

In the system, (a) the title correlation score is incremented by the first amount when the at least one of the first terms that exactly matches the at least one of the second terms is a noun; (b) the title correlation score is incremented by a second amount when the at least one of the first terms that exactly matches the at least one of the second terms is a verb; and (c) the first amount is greater than the second amount.

In the system, the composite correlation score for the particular microapp depends on API correlation score that is established by an API correlation score process comprising (a) identifying one or more API action types invoked by the networked application; (b) identifying one or more commands invoked by the particular microapp; and (c) incrementing the API correlation score by a first amount in response to at least one of the API action types corresponding to at least one of the commands invoked by the particular microapp.

In the system, (a) the one or more API action types are selected from a group consisting of "create", "new", "change", and "enroll"; and (b) the one or more commands invoked by the particular microapp are of command type POST.

In the system, the API correlation score process further comprises (a) identifying one or more synonyms for at least one of the one or more API action types; and (b) incrementing the API correlation score by a second amount in response to at least one of the synonyms corresponding to at least one of the commands invoked by the particular microapp; wherein the first amount is greater than the second amount.

In the system, the composite correlation score of the particular microapp depends on a user interface element correlation score that is established by a user interface element correlation score process comprising (a) identifying first parameters that characterize an element that forms part of the user interface displayed by the networked application; (b) identifying second parameters that characterize a user interface element displayed by the particular microapp; and (c) incrementing the user interface element correlation score in response to a plurality of the first parameters corresponding to a plurality of the second parameters.

In the system, the first and second parameters each include at least one of a label parameter, a value type parameter, or a value parameter.

In the system, (a) the user interface element correlation score is incremented by a first amount in response to two of the first parameters corresponding to two of the second parameters; (b) the user interface element correlation score is incremented by a second amount in response to more than two of the first parameters corresponding to more than two of the second parameters; and (c) the second amount is greater than the first amount.

In at least one example, a method for generating a microapp recommendation is provided. The method comprises receiving, at a client computing device, microapp metadata that characterizes a plurality of microapps. The method further comprises using a resource access application executing at the client computing device to launch a networked application that displays a user interface at the client computing device. The method further comprises calculating a composite correlation score for a particular one of the microapps. The composite correlation score quantifies correlation between functionality provided by the user interface of the networked application and functionality provided by the particular microapp. The method further comprises using the composite correlation score to make a determination with respect to whether the particular microapp should be recommended to a user of the client computing device. The method further comprises, in response to determining that the particular microapp should be recommended to the user of the client computing device, displaying a supplemental user interface that provides a recommendation for the particular microapp.

Examples of the method can incorporate one or more of the following features.

In the method, the composite correlation score for the particular microapp depends on a title correlation score that is established by a title correlation score process comprising (a) identifying one or more first terms used in a title label associated with the user interface displayed by the networked application; (b) identifying one or more second terms used in an action title label associated with the particular microapp; and (c) incrementing the title correlation score by a first amount in response to at least one of the one or more first terms exactly matching at least one of the one or more second terms.

In the method, the composite correlation score for the particular microapp depends on an API correlation score that is established by an API correlation score process comprising (a) identifying one or more API action types invoked by the networked application; (b) identifying one or more commands invoked by the particular microapp; and (c) incrementing the API correlation score by a first amount in response to at least one of the API action types corresponding to at least one of the commands invoked by the particular microapp.

In the method, the composite correlation score of the particular microapp depends on a user interface element correlation score that is established by a user interface element correlation score process comprising (a) identifying first parameters that characterize an element that forms part of the user interface displayed by the networked application; (b) identifying second parameters that characterize a user interface element displayed by the particular microapp; and (c) incrementing the user interface element correlation score in response to a plurality of the first parameters corresponding to a plurality of the second parameters.

In at least one example, a non-transitory computer readable medium stores processor-executable instructions to generate a microapp recommendation. The processor-executable instructions comprise instructions to receive, at a client computing device, microapp metadata that characterizes a plurality of microapps. The processor-executable instructions further comprise instructions to use a resource access application executing at the client computing device to launch a networked application that displays a user interface at the client computing device. The processor-executable instructions further comprise instructions to calculate a composite correlation score for a particular one of the microapps. The composite correlation score quantifies correlation between functionality provided by the user interface of the networked application and functionality provided by the particular microapp. The processor-executable instructions further comprise instructions to use the composite correlation score to make a determination with respect to whether the particular microapp should be recommended to a user of the client computing device. The processor-executable instructions further comprise instructions to, in response to determining that the particular microapp should be recommended to the user of the client computing device, display a supplemental user interface that provides a recommendation for the particular microapp.

Examples of the non-transitory computer readable medium can incorporate one or more of the following features.

In the non-transitory computer readable medium, the composite correlation score for the particular microapp depends on a title correlation score that is established by a title correlation score process comprising (a) identifying one or more first terms used in a title label associated with the user interface displayed by the networked application; (b) identifying one or more second terms used in an action title label associated with the particular microapp; and (c) incrementing the title correlation score by a first amount in response to at least one of the one or more first terms exactly matching at least one of the one or more second terms.

In the non-transitory computer readable medium, the composite correlation score for the particular microapp depends on an API correlation score that is established by an API correlation score process comprising (a) identifying one or more API action types invoked by the networked application; (b) identifying one or more commands invoked by the particular microapp; and (c) incrementing the API correlation score by a first amount in response to at least one of the API action types corresponding to at least one of the commands invoked by the particular microapp.

In the non-transitory computer readable medium, the composite correlation score of the particular microapp depends on a user interface element correlation score that is established by a user interface element correlation score process comprising (a) identifying first parameters that characterize an element that forms part of the user interface displayed by the networked application; (b) identifying second parameters that characterize a user interface element displayed by the particular microapp; and (c) incrementing the user interface element correlation score in response to a plurality of the first parameters corresponding to a plurality of the second parameters.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, each identical or nearly identical component that is illustrated is represented by a like reference numeral. For purposes of clarity, every component may not be labeled in every figure.

FIGS. 3A-3C comprise a flowchart illustrating an example method for recommending microapps based on a corresponding networked application.

FIG. 9 is a screenshot illustrating an example networked application user interface with extracted label, label type, and value parameters listed in an adjacent table for certain user interface elements.

FIG. 10 is a side-by-side view of the tables of FIGS. 8 and 9 with matching parameters indicated.

DETAILED DESCRIPTION

Figure 1:
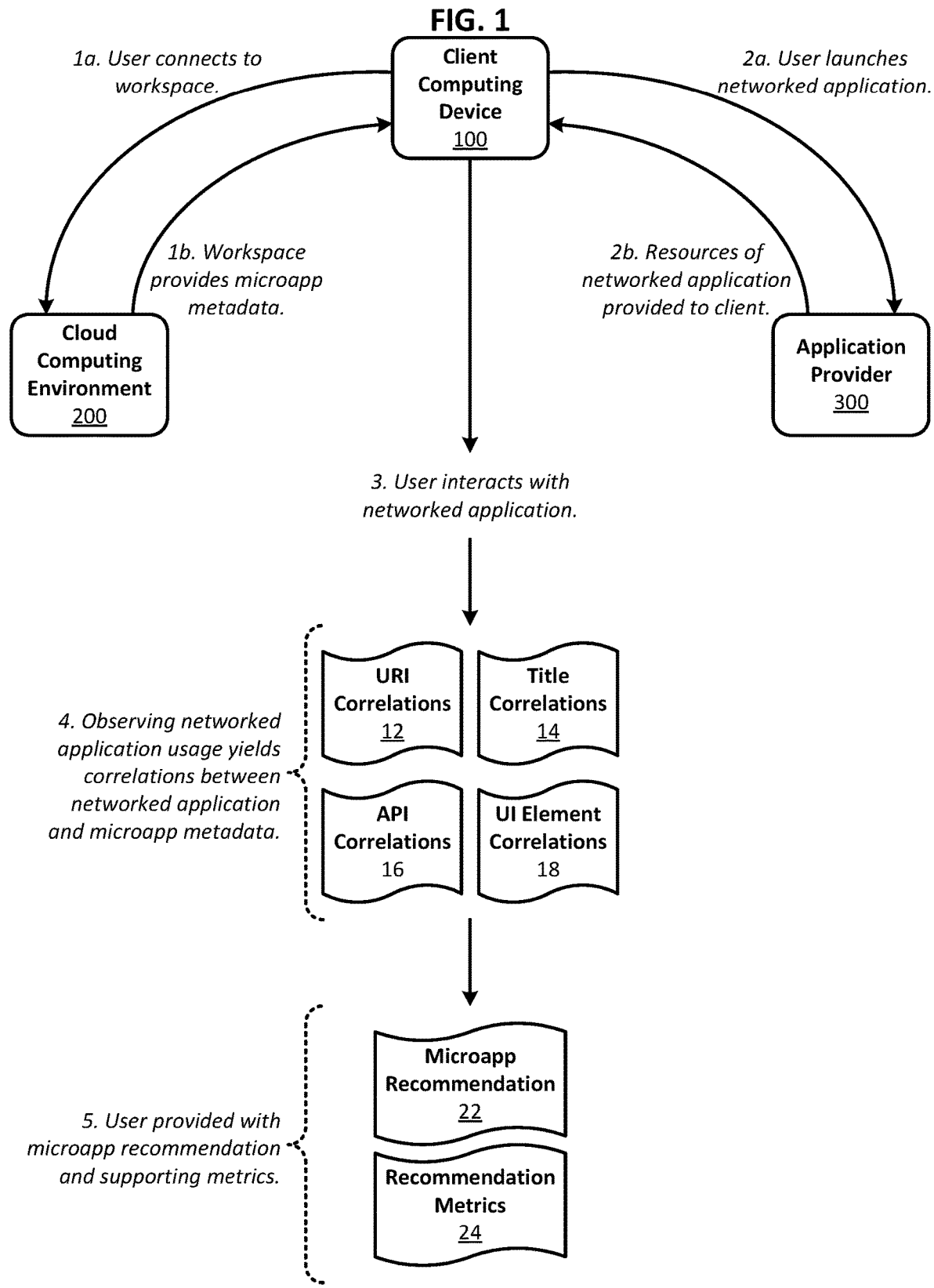
FIG. 1 is a block diagram schematically illustrating selected data flows that are implemented in an example technique for recommending microapps based on a corresponding networked application.

As noted above, microapps provide a user with frequently invoked functionality from a range of different applications via a relatively simple, contained interface. Microapps accomplish this by synchronizing data from a user's applications in a way that allows the user to access data and functionality provided by an underlying application without actually launching the underlying application or toggling to a different interface. User actions taken within a microapp serve as the basis for inputs provided to an underlying application. From a conceptual standpoint, microapps can thus be understood as unbundling the functionality provided by a user's applications to provide the user with simplified actions within the user's preferred working environment, such as a web browser or digital workspace. Examples of frequently invoked actions that can be streamlined using microapps include submitting helpdesk tickets, approving expense reports, confirming calendar appointments, and reviewing vacation requests.

The wide-ranging productivity and usability benefits of microapps has led to rapid growth in the number of available microapps. The large and continually growing inventory of available microapps means that individual users may be unaware of those microapps which are most relevant to their frequently invoked workflows. For example, a user may not be motivated to undertake the effort to search for a microapp that, from the user's perspective, may or may not exist. A user may not appreciate the potential time savings that using a microapp would provide, or may incorrectly assume that any efficiency to be gained through use of a microapp would not justify the effort required to find the microapp in the first place. Or a user might simply be unaware that a microapp has been specifically tailored for his/her most frequently invoked operations. For these and other reasons, many users continue to undertake operations in enterprise applications despite the existence of a more efficient way of implementing the same operations via a microapp. Regardless of the reason, the result is a loss in productivity and a barrier to adoption of intelligent workspaces that dynamically adapt to changes in a user's day-to-day operations. The foregoing makes clear that there exists a need to efficiently move users to those existing microapps that are most likely to increase their productivity.

One way of addressing this need to is deploy microapps using a subscription model. Under a subscription model an administrator grants individual users and/or user groups access to a microapp by way of a managed subscription. Once a user is subscribed to a microapp, either via an individual subscription or membership in a subscribed user group, the user can access functionality and receive notifications provided by the subscribed microapp. For example, in the case of a user who works in the context of a digital workspace, subscribing the user to a particular microapp allows the user to access functionality associated with the subscribed microapp via his/her digital workspace. The subscription model, in principle, thus provides an efficient way to manage microapp usage in an organization, with particular microapp functionality being deployed to relevant users and/or user groups based their frequently invoked workflows. The subscription model is intended to eliminate any need for individual users to monitor the continually growing inventory of available microapps for new offerings that could be relevant to their individual workflows. In theory, administrators will assume this responsibility.

However, as a practical matter, the subscription model relies on having an administration team that is able to accurately and efficiently generate microapp subscriptions that are specifically tailored to the needs of particular users and/or user groups. This administration process remains heavily reliant on human knowledge and intuition. For example, to generate and manage useful microapp subscriptions, administrators should know how a user leverages his/her existing microapp subscriptions, what application functionality a user frequently invokes, and what microapps are available to provide that frequently invoked functionality. But administrators have imperfect knowledge of an organization's continually evolving workflows. Inevitably there will be microapps that, while providing functionality that members of a particular user group frequently invoke, are unknown to the relevant administration team that manages microapp subscriptions for the user group. Conversely, there will often exist subscribed microapps that, in fact, members of the user group use infrequently, if at all. These circumstances represent an inefficient usage of resources and a lost opportunity to increase user productivity.

Beyond this, because microapp subscriptions are often administered to user groups, administrators should further be able to effectively define user groups that can benefit from a common suite of subscribed microapps. In a large organization it is difficult for administrators to curate this individualized usage data across workgroups, thus presenting yet another obstacle to the efficient management of microapp subscriptions. This challenge increases as microapps become more popular and as their usage becomes more prevalent across an organization.

Given the challenges associated with efficiently managing microapp subscriptions, efforts have been made to develop techniques for making individually tailored microapp recommendations based on observations of a particular user's workflow. These observations are often based on the user's interactions with application services provided via a digital workspace. This may involve making observations with respect to how a user interacts with enterprise applications which are accessed in a networked environment, such as SaaS applications and web applications. For example, if a user accesses a SaaS application page that provides an accounting of his/her available vacation days, ideally the user would be presented with a recommendation for a microapp that displays the requested accounting. And if the user subsequently uses the same SaaS application to navigate to an interface that enables submission of a time off request, ideally the user would be presented with a further recommendation for a microapp that allows a time off request to be submitted. These examples are based on the general principle that a recommendation is especially efficient and effective when presented as an improved solution to a user's immediate task at hand.

Despite the potential value of such individually tailored microapp recommendations, existing techniques for making such recommendations suffer from a number of shortcomings. For example, in the context of SaaS applications, web applications, or other networked applications, existing microapp recommendation frameworks may detect when a user navigates to a URI that is known to be associated with a particular networked application, and then generate microapp recommendations based on the functionality provided by the associated application. But recommendations made on this basis are unreliable since many networked applications, including most single page applications, provide functionality that is independent of URI. In particular, many networked applications provide multiple paths to access the same functionality, with each path being associated with a different URI. Thus, microapp recommendations based solely on URI detection are often not closely tailored to a user's observed workflows.

In many cases an existing enterprise application will have embedded analytical tools that track and provide administrators with insights into how the application is being used on an ongoing basis. In particular, these embedded analytical tools allow administrators to record, monitor, and analyze how users interact with an application and related digital content. These tools can also be used to embed survey questions and other polls into an application, thus providing a gauge of user sentiment vis-à-vis the application. In addition to providing administrators with valuable feedback with respect to usage patterns, embedded analytical tools also help increase user engagement through user notifications that can inform users of relevant updates and other announcements.

While existing analytical tools provide valuable insights into use patterns and user sentiment and have proven effective in increasing user engagement, such solutions have been unable to effectively provide individually tailored microapp recommendations. For example, existing analytical tools rely on manual administration and subject matter experts with specific knowledge of a particular application. Thus, while such tools may be used to communicate a recommendation effectively, the underlying need for manual administration precludes them from efficiently generating the recommendation in the first place. For example, if an enterprise application receives a user interface update, existing analytics integrations may no longer be effective, thus requiring continual manual maintenance and overhead as updates are deployed. Furthermore, as new microapps are continually developed, further manual integration is required since a subject matter expert will need to create recommendations for the new microapp and integrate those recommendations into existing applications. This lack of scalability is another reason why embedded analytical tools have not been seen as an effective means of providing individually tailored microapp recommendations.

Improved Microapp Recommendation Framework

In view of the foregoing shortcomings, an improved microapp recommendation framework has been developed. In particular, FIG. 1 is a block diagram schematically illustrating selected data flows that are implemented in an example technique for recommending microapps based on a corresponding networked application. The example technique is described in the context of a user who accesses SaaS applications, web applications, and/or other networked applications via a digital workspace, although it will be appreciated that the techniques disclosed herein can also be implemented in a wide range of other contexts and vis-à-vis a wide range of enterprise applications, including desktop applications. The example technique begins when a user of a client computing device 100 connects to a digital workspace provided via a cloud computing environment 200.

Metadata characterizing available microapps is provided to the client computing device 100 to support subsequent microapp recommendations. The user may later launch a networked application, such as a SaaS application, web application, or other enterprise application. In the case of networked applications, application resources are provided from one or more application providers 300.

The user interacts with the networked application in the course of completing his/her tasks. Before these interactions occur, as these interactions occur, and/or after these interactions occur, various observations are made with respect to the specific application functionalities and resources that are accessed and further with respect to the specific application user interfaces that are invoked. Data characterizing these functionalities are collected, including data characterizing the network addresses (for example URIs) of the application resources, the APIs which are available to the user, and the user interface elements which are displayed. This functionality data can be compared with the aforementioned microapp metadata to draw various correlations between the networked application and the available microapps. Additional details with respect to how these correlations are determined will be disclosed in turn, but the resulting correlations include one or more of (a) correlations between URIs accessed by a networked application and URIs accessed by a microapp, referred to herein as URI correlations 12; (b) correlations between a page or dialog title provided by a networked application and an action name provided by a microapp, referred to herein as title correlations 14; (c) correlations between an API used by a networked application and an API used by a microapp, referred to herein as API correlations 16; and (d) correlations between user interface elements displayed by a networked application and user interface elements displayed by a microapp, referred to herein as user interface element correlations 18.

The foregoing correlations can be used to generate a microapp recommendation 22 that is related to the functionality that the user accesses via the networked application. For example, if a user accesses a SaaS application page that allows a vacation request to be submitted, the aforementioned correlations will identify a microapp that streamlines the process of submitting the vacation request. Because such recommendation can, in certain implementations, be based on specific observations about the user's interactions with the networked application, and in particular can be based on the characteristics of the various user interfaces the user accesses, it will tend to be more accurate and impactful than a recommendation based on, for example, a user group subscription or a common URI. In addition, certain implementations supplement microapp recommendation 22 with value insights intended to motivate the user to use the recommended microapp. These value insights are made in recognition of the fact that motivating a user to change his/her workflow can be challenging. The value insights may include, for example, recommendation metrics 24 that quantify productivity time savings or overall productivity insights that can help motivate the user to adopt the recommendation. An example recommendation metric that is individually tailored might indicate: "It took you twenty seconds to submit your vacation request. Users who submitted a vacation request using the recommended microapp accomplished the same operation in seven seconds." An example recommendation metric that provides an overall productivity insight might indicate: "395 users who have used the recommended microapp have saved 33 hours as a result of doing so." Existing microapp recommendation systems lack such value insights.

Definitions

As used herein, the term "microapp" refers, in addition to its ordinary meaning, to a lightweight software application configured to provide a user with simplified access to specific functionality and/or data that is provided by one or more underlying applications. For example, microapps allow a user to view information and perform actions without launching or switching context to a particular underlying application. Microapps streamline workflows by reducing context switching and eliminating the need to learn how to use more complex applications. Microapps are often deployed using a subscription model in which an administrator grants individual users and/or user groups access to a microapp by way of a managed subscription. Once a user is subscribed to a microapp, either via an individual subscription or membership in a subscribed user group, the user can access functionality and receive notifications provided by the subscribed microapp. Users can also leverage microapps on an individual basis, outside any subscription model.

As used herein, the term "networked application" refers, in addition to its ordinary meaning, to an application that is capable of providing resources over a communication network. Examples of networked applications include SaaS applications, web applications, enterprise applications, homegrown applications, and other proprietary applications. Examples of SaaS applications include Microsoft Office 365 applications, SAP SaaS applications, Workday applications, and the like. The resources provided by a networked application can be accessed using any suitable resource access application, examples of which include a web browser and a digital workspace application. The resources provided by a networked application can be provided to a client device using any number of suitable techniques. For example, in one implementation a server may execute remote presentation services software that uses a thin client or a remote display protocol to capture display output generated by the application executing on the server and to transmit the application display output to a client device.

System Architecture

Figure 2:
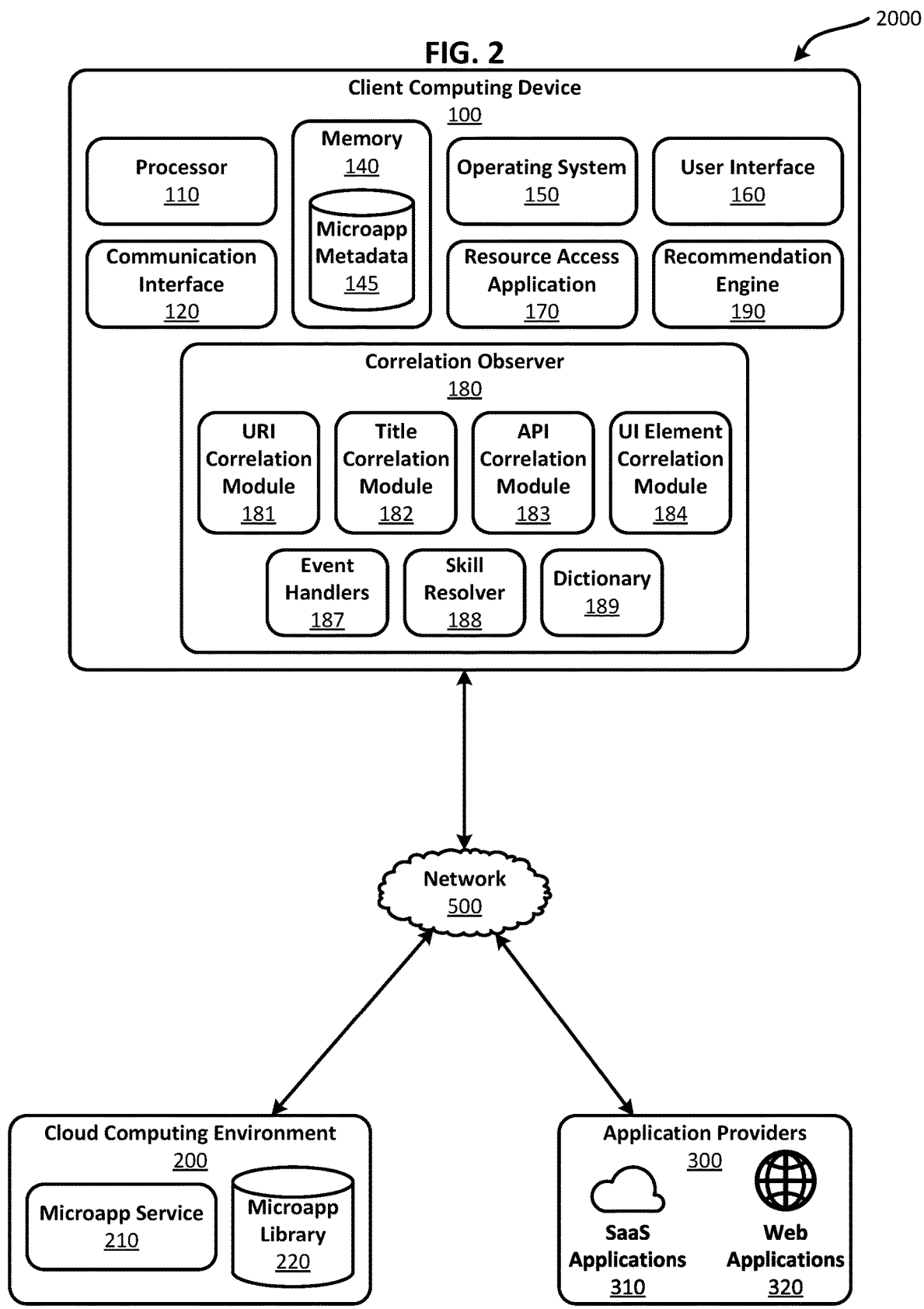
FIG. 2 is a block diagram schematically illustrating selected components of an example framework for recommending microapps based on a corresponding a networked application.

FIG. 2 is a block diagram schematically illustrating selected components of an example framework 2000 for recommending microapps based on a corresponding networked application. Framework 2000 includes client computing device 100, which is associated with a user and which is configured to access digital workspace resources associated with cloud computing environment 200 and to also access networked application resources associated with one or more application providers 300. Client computing device 100, cloud computing environment 200, and application providers 300 communicate with each other via a network 500. Network 500 may be a public network (such as the Internet) or a private network (such as a corporate intranet or other network with restricted access). Network 500 may employ one or more types of physical networks and/or network topologies, such as wired and/or wireless networks, and may employ one or more communication transport protocols, such as transmission control protocol (TCP), internet protocol (IP), user datagram protocol (UDP), or other similar protocols.

While only one client computing device is illustrated in FIG. 2 for clarity, it will be appreciated that, in general, framework 2000 is capable of recommending microapps to an arbitrary number of users accessing resources from an arbitrary number of cloud computing environments and an arbitrary number of application providers. More generally, other embodiments may have fewer or more communication paths, networks, subcomponents, and/or resources depending on the granularity of a particular implementation. For example, in some implementations at least a portion of the functionality disclosed herein is provided by one or more applications executing locally at client computing device 100. In other implementations functionality may be provided via cloud computing environment 200 or a dedicated networked application provided by one of application providers 300. More generally, it should be appreciated that the embodiments described and illustrated herein are not intended to be limited to the provision or exclusion of any particular services and/or resources.

Client computing device 100 is configured to generate microapp recommendations by analyzing how a user interacts with resources provided by a network application. More specifically, client computing device 100 is configured to draw correlations between a networked application and one or more available microapps, and to generate microapp recommendations based on such correlations. To this end, client computing device 100 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain embodiments. As illustrated in FIG. 2, client computing device 100 includes one or more software modules and/or software components configured to implement certain of the functionalities disclosed herein as well as hardware capable of enabling such implementation.

The implementing hardware may include, but is not limited to, a processor 110, a communication interface 120, a memory 140, and any other suitable components that enable client computing device 100 to interact with other components of microapp recommendation framework 2000 as disclosed herein, or with human users of such framework 2000. Examples of such other components include, but are not limited to, a bus and/or interconnect, a display, a textual input device (such as a keyboard), a pointer-based input device (such as a mouse), a microphone, and a camera.

Processor 110 can be implemented by one or more programmable processors to execute one or more executable instructions, such as a computer program, to perform functions disclosed herein. As used herein, the term "processor" describes circuitry that performs a function, an operation, or a sequence of operations. The function, operation, or sequence of operations can be hard coded into the circuitry or soft coded by way of instructions held in memory 140 and executed by the processor circuitry. Processor 110 can perform the function, operation, or sequence of operations using digital values and/or using analog signals. In some examples, processor 110 can be embodied in one or more application specific integrated circuits, microprocessors, digital signal processors, graphics processing units, microcontrollers, field programmable gate arrays, programmable logic arrays, multicore processors, or general-purpose computers with associated memory. Processor 110 can be analog, digital, or mixed. Processor 110 can be one or more physical processors, which in some cases may be remotely located from client computing device 100. A processor 110 that includes multiple processor cores and/or multiple processors can provide functionality for parallel, simultaneous execution of instructions or for parallel, simultaneous execution of one instruction on more than one piece of data.

Communication interface 120 can include one or more interfaces to enable client computing device 100 to access network 500, which may be a local area network, a wide area network, a personal area network, or the Internet. Communication interface 120 may access network 500 through a variety of wired and/or wireless connections, including cellular connections and Bluetooth connections. In some examples, network 500 may allow for communication with other computing devices to enable distributed computing. Examples of such other computing devices include cloud computing environment 200 and application providers 300.

Memory 140 can be implemented using any suitable type of digital storage, such as one or more of a disk drive, a redundant array of independent disks, a flash memory device, or a random access memory (RAM) device. In general, memory 140 will include volatile and/or nonvolatile memory resources. In certain embodiments memory 140 comprises a non-transitory computer readable medium that is used to store instructions that, when executed using processor 110, cause operations associated with the various software modules and components described herein to be invoked. Memory 140 may include one or more types of RAM and/or a cache memory that can offer a faster response time than a main memory. In one implementation memory 140 stores microapp metadata 145 that is retrieved from cloud computing environment 200 and that characterizes one or more microapps which are available to client computing device 100, as will be discussed in turn.

As noted above, client computing device 100 also includes one or more software modules and/or software components configured to implement certain of the functionalities disclosed herein. The implementing software may include, but is not limited to, an operating system 150, a user interface 160, a resource access application 170, a correlation observer 180, a recommendation engine 190, and any other suitable components that enable client computing device 100 to perform one or more of the functionalities disclosed herein. In one implementation the implementing software is stored in memory 140. For example, the implementing software can be stored in nonvolatile memory and copied to volatile memory prior to execution. In some examples, volatile memory can offer a faster response time than a nonvolatile memory. Data can be entered through user interface 160, received from an input/output device, or received via communication interface 120. In general, the implementing software can be understood as comprising instructions that, when executed, cause data to be manipulated and cause operations associated with the various software modules and components described herein to be invoked.

Operating system 150 may comprise any suitable operating system, such as Google Android, Microsoft Windows, Apple OS X, or Linux. In general, the techniques provided herein can be implemented without regard to the particular operating system provided in conjunction with client computing device 100, and therefore may be implemented using any suitable existing or subsequently developed platform. Operating system 150 supports functional elements provided by user interface 160, such as a graphical user interface, examples of which include controls presented on a touchscreen, a display, or the like. User interface 160 can additionally or alternatively include one or more input/output devices, examples of which include a mouse, a keyboard, a microphone, one or more speakers, one or more cameras, one or more biometric scanners, one or more environmental sensors, one or more accelerometers, one or more visors, and the like.

Resource access application 170 allows a user to communicate with, and access resources provided by, cloud computing environment 200 and/or application providers 300. For example, in certain implementations resource access application 170 presents user interface 160 at client computing device 100 which allows the user to access resources provided by application providers 300. Resource access application 170 can be installed on client computing device 100 or can be executed in cloud computing environment 200 and accessed using another software application such as a web browser. In certain embodiments resource access application 170 is itself a web browser. In general, resource access application 170 can be understood as providing the user with a personalized interface that enables seamless access to the user's networked applications, files, desktops, mobile applications, local applications, and/or other data. Microapps can execute within resource access application 170, and in particular, can provide users the ability to perform actions within resource access application 170 without having to launch or switch context to a separate native application.

In some implementations resource access application 170 may load background and content scripts into an embedded browser. Various event handlers 187 may be activated to monitor and track a user's interactions with a networked application. Event handlers 187 may include a browser navigation handler, a mutation observer, an event listener, other event handlers to detect mouse/keyboard inputs (and/or other forms of inputs, such as, touchscreen, gestures, spoken commands, and the like), and/or other types of event handlers to detect document object model (DOM) changes with respect to an application interface.

Correlation observer 180 is configured to evaluate one or more different correlations between (a) a networked application which the user has accessed via one of application providers 300 and (b) one or more microapps that are available to the user via cloud computing environment 200. To accomplish this, correlation observer 180 records interaction data corresponding to a user's interactions with a networked application. In certain implementations this interaction data characterizes various user interfaces of the networked application that the user accesses or otherwise invokes. In certain implementations correlation observer 180 evaluates the one or more microapps based on microapp metadata 145 retrieved from cloud computing environment 200 and stored in memory 140. In certain embodiments correlation observer 180 is included within or operates in conjunction with an application executing on client computing device 100, such as resource access application 170.

In the example framework 2000 that is schematically illustrated in FIG. 2, correlation observer 180 includes various modules that are specifically configured to evaluate particular correlations, including one or more of a URI correlation module 181, a title correlation module 182, an API correlation module 183, and a user interface element correlation module 184. Correlation observer 180 additionally or alternatively includes additional modules that facilitate the observation, interpretation, and/or recording of activity at client computing device 100, including one or more event handlers 187, a skill observer 188, and a dictionary 189. Additional details with respect to the implementation and functionality of these modules will be provided in turn. Additional or fewer modules may be implemented in other embodiments depending on the particular correlations which are of interest in a particular application.

The correlations that correlation observer 180 evaluates can form the basis for microapp recommendations generated by recommendation engine 190. Stated alternatively, recommendation engine 190 is configured to identify one or more microapps for recommendation to a user based on the correlations that correlation observer 180 evaluates. For example, suppose that a user is observed to interact with a particular networked application user interface that is evaluated to be closely correlated with a "request time off" microapp. In response, recommendation engine 190 can be configured to provide the user, via user interface 160, with a recommendation to use the "request time off" microapp instead of the networked application which the user had initially launched. In certain implementations recommendation engine 190 optionally provides the user with metrics to support a recommendation. Such recommendation metrics can quantify productivity time savings or overall productivity insights, and can thereby help motivate the user to adopt a recommendation.

Cloud computing environment 200 provides shared computing services, resource activity feeds, and/or notification processes to multiple clients including client computing device 100. These computing services and/or resources support functionality provided by client computing device 100. For example, to support functionality associated with the microapp recommendation framework 2000 described herein, cloud computing environment 200 provides access to, among other things, a microapp service 210 and a microapp library 220. Cloud computing environment 200 optionally provides additional services in alternative implementations, including a data integration provider service, a client interface service, a credential wallet service, an active data cache service, and/or a notification service. Cloud computing environment 200 may implemented using, for example, Microsoft Azure Cloud, Amazon Web Services, Google Cloud, or IBM Cloud.

As illustrated, cloud computing environment 200 includes microapp service 210 and microapp library 220. As noted above, a microapp can be understood as a single use case made available to users to streamline functionality from complex enterprise applications. In certain implementations microapps use APIs available within SaaS, web, or homegrown applications, thereby allowing users to see content without needing a full launch of the application and without needing to switch context. Absent such microapps, users would need to, for example, launch an application, navigate to the action they need to perform, and then perform the action. Microapps thus streamline routine tasks for frequently performed actions and provide users the ability to perform actions within resource access application 170 without having to launch or switch context to the corresponding native application. An administrator can configure microapps within cloud computing environment 200, thus providing a powerful tool to create more productive workflows without the need for additional infrastructure. Whether pushed to a user or initiated by a user, microapps can provide shortcuts that simplify and streamline key tasks that would otherwise require accessing full enterprise applications.

In certain implementations microapp library 220 stores not only microapps but also microapp metadata that defines various attributes and parameters that characterize the stored microapps. These attributes and parameters can be provided to client computing device 100 and used by correlation observer 180 to evaluate correlations between networked applications and microapps. Examples of such metadata include a domain URI for a corresponding enterprise application, a microapp title, an API and/or commands that the microapp uses to access functionality of a corresponding enterprise application, user interface field attributes (such as field labels and value types), user interface field values (such as values provided for selection in a dropdown menu), icons, and other parameters that define the user interface elements that a microapp uses. Other metadata can be stored in other embodiments depending on the particular correlations that are to be used to identify relationships between a user's microapps and the networked applications that the user frequently invokes. This metadata can also be leveraged to help a user to query microapp library 220 for relevant microapps.

Referring again to FIG. 2, one or more of application providers 300 may operate as an application delivery controller (ADC) to provide client computing device 100 with access to business applications and other resources delivered as SaaS applications 310, web applications 320, virtual Windows applications, virtual Linux applications, mobile applications, file sharing systems, or any other networked application. Examples of SaaS applications include Microsoft Office 365 applications, SAP SaaS applications, Workday applications, and the like. In addition to data and application resources, application providers 300 may also offer other computing resources such as storage, networking, server, virtualization, operating system, middleware, and/or runtime resources. As noted previously, in certain implementations resource access application 170 is configured to provide a unified interface that enables access to resources provided by application providers 300. For example, in some implementations a user may access a networked application via a specialized browser embedded or embodied in resource access application 170. Once authentication requirements are satisfied, communication may occur directly between a preferred browser and a networked application, thus allowing a user to access the networked application directly via client computing device 100. Depending on the requirements of a particular implementation, networked applications may incorporate enhanced security policies to enforce restrictions on an embedded browser or other application.

Methodology

FIGS. 3A-3C comprise a flowchart illustrating an example method 3000 for recommending microapps based on a corresponding networked application. Method 3000 can be implemented, for example, using the framework 2000 illustrated in FIG. 2 and described herein, and in particular, using functionality provided by one or more of client computing device 100, cloud computing environment 200, and application providers 300. However other system architectures can be used in other implementations. To this end, the correlation of the various functionalities shown in FIGS. 3A-3C to client computing device 100, cloud computing environment 200, and application providers 300 (and their various subcomponents) is not intended to imply any structural and/or use limitations. Rather, other implementations may include, for example, varying degrees of integration wherein certain functionalities are effectively performed by different systems or modules. For example, in an alternative implementation, functionality illustrated as being provided by client computing device 100 may instead be provided by a resource management service provided by cloud computing environment 200. Thus other implementations may have fewer or more modules depending on the granularity of a particular implementation. As can be seen, method 3000 includes a number of phases and subprocesses, the sequence of which may vary from one implementation to another. However, when considered in the aggregate, these phases and subprocess are capable of generating microapp recommendations based on a corresponding a networked application.

In one implementation, method 3000 starts when resource access application 170 is used to launch a digital workspace. See reference numeral 3110 in FIG. 3A. A digital workspace is a form of virtual desktop infrastructure (VDI) in which virtual desktop sessions are delivered as a cloud service along with the application services provided via the virtual desktop. Citrix Cloud is an example of a VDI delivery platform, and the Citrix Workspace application can be used as a single entry point for the resources provided via Citrix Cloud. Citrix Cloud and Citrix Workspace are provided by Citrix Systems, Inc. of Fort Lauderdale, Fla.

Upon launching the digital workspace, resource access application 170 retrieves microapp metadata from cloud computing environment 200. See reference numeral 3120 in FIG. 3A. As noted above, microapp metadata may include, but is not limited to, a domain URI for a corresponding enterprise application, a microapp title, an API and/or commands that the microapp uses to access functionality of a corresponding enterprise application, user interface field attributes (such as field labels and value types), user interface field values (such as values provided for selection in a dropdown menu), icons, and other parameters that define the user interface elements that a microapp uses. In many cases this metadata may be defined by an administrator at the time a microapp is built or initially configured. For example, while configuring a new microapp an administrator may define a domain URI for resources provided by a networked application where the microapp is intended to leverage those resources. To provide a more specific example, a microapp that is integrated with a SaaS application called "SaaS-App1" may be associated with a domain URI "SaaS-App1.example.net", a microapp that is integrated with a SaaS application called "SaaS-App2" may be associated with a domain URI "SaaS-App2.example2.net", and so forth. The metadata retrieved from cloud computing environment 200 can be used by correlation observer 180 to evaluate correlations between networked applications and microapps, as will be described in turn.

After launching the digital workspace, the user may eventually wish to access functionality provided by a networked application such as one of SaaS applications 310 or one of web applications 320. Resource access application 170 can be used to launch a networked application. See reference numeral 3140 in FIG. 3A. In an implementation where an embedded browser is used to launch the networked application, the browser may open a homepage for the launched application and the networked application can be launched in the browser. Continuing with the above example of a SaaS application called "SaaS-App1", the browser may open a homepage "https://SaaS-App1.example.net/home". In this case, the domain corresponding to the launched application is "SaaS-App1.example.net". A networked application can also be launched using a browser plugin.

Upon launching the application a start timestamp is set. See reference numeral 3150 in FIG. 3A. The start timestamp can later be used to calculate recommendation metrics for a generated microapp recommendation, as will be described in turn. In an example implementation setting the start timestamp includes initiating a timer that remains active when the user is actively engaged with the networked application, but which pauses automatically when, for example, a browser tab is inactive. In such implementations all events are available to the browser (or to the relevant browser plugin) so that the user's time spent in active engagement with the networked application can be determined with reasonable accuracy. In some implementations, each interface provided by a networked application is associated with its own interaction timer. An interaction timer can be operated using event handlers 187 or other code included in a resource access application 170.

Once the networked application launches, various browser event handlers 187 can be initialized to identify and record navigation events for the networked applications whose domain is within the application domain noted above (for example, "SaaS-App1.example.net" for the hypothetical SaaS application "SaaS-App1"). See reference numeral 3160 in FIG. 3A. Mutation observer events can also be initialized to detect DOM element changes. See reference numeral 3170 in FIG. 3A. These operations allow events associated with the networked application to be detected even when the relevant URI remains static, such as when a dialog box is displayed over an underlying webpage. In some embodiments the event handlers may include a Browser Navigation handler, an Event Listener, an event handler configured to detect DOM changes within a webpage, and/or other event handlers configured to detect mouse inputs, keyboard inputs, touchscreen inputs, gestures, spoken commands, and other types of user input.

After the networked application is launched, the degree to which functionality provided by the networked application correlates to the functionality provided by the various microapps available to the user can be evaluated. For example, when a user access an interface in a networked application that provides particular functionality, and when there exists a microapp that also provides that same functionality, that microapp will be considered for recommendation to the user. The recommendation can be presented to the user while the user is interacting with the networked application, or shortly after the user invokes the functionality under consideration. A correlation score can be evaluated for one or more microapps in a given library of available microapps, and one or more microapps with the highest correlation scores can be recommended to the user. The correlation score can be understood as evaluating a strength of relationship between the functionality provided by a microapp and the functionality that the user was observed to have invoked or accessed using the networked application. Such a correlation score thus forms the basis for recommending a specific microapp to the user. In certain implementations the correlation score can be normalized between zero and one, with a value of zero indicating no correlation and a value of one indicating a strong correlation. In certain implementations a correlation score can be evaluated without the user ever having implemented the functionality in question, but rather based on the user having accessed a user interface that provides such functionality.

To provide a generalized example, consider a user interacting with page i in networked application SX, denoted herein as $SX_i$. And assume that the user has available to him/her a microapp MA that is capable of invoking two different actions, action j and action k. These two actions j and k of microapp MA are denoted herein as $MA_j$ and $MA_k$, respectively. In this case, the correlation of the functionality provided by $SX_i$ with $MA_j$ is denoted as $SX_iMA_j$, and the correlation of the functionality provided by $SX_i$ with $MA_k$ is denoted as $SX_iMA_k$. If $SX_iMA_j > SX_iMA_k$, then microapp action $MA_j$ will be recommended to the user before microapp action $MA_k$ is recommended.

The degree to which functionality provided by a networked application correlates to the functionality provided by various microapps available to the user can be evaluated using one or more of several different correlation metrics. In certain implementations correlation observer 180 evaluates a URI correlation metric as a threshold measure. See reference numeral 3210 in FIG. 3B. This provides an optional initial filtering of the available microapps, thus allowing a more focused set of URI-correlated microapps 30 to be curated. This can make subsequent correlation evaluations more efficient by reducing the number of microapps that are evaluated. For example, when a user invokes a networked application with a base URI of "issues.example.net", then only microapps mapped to this URI can be further evaluated, thus streamlining subsequent correlation evaluations.

Figure 4:
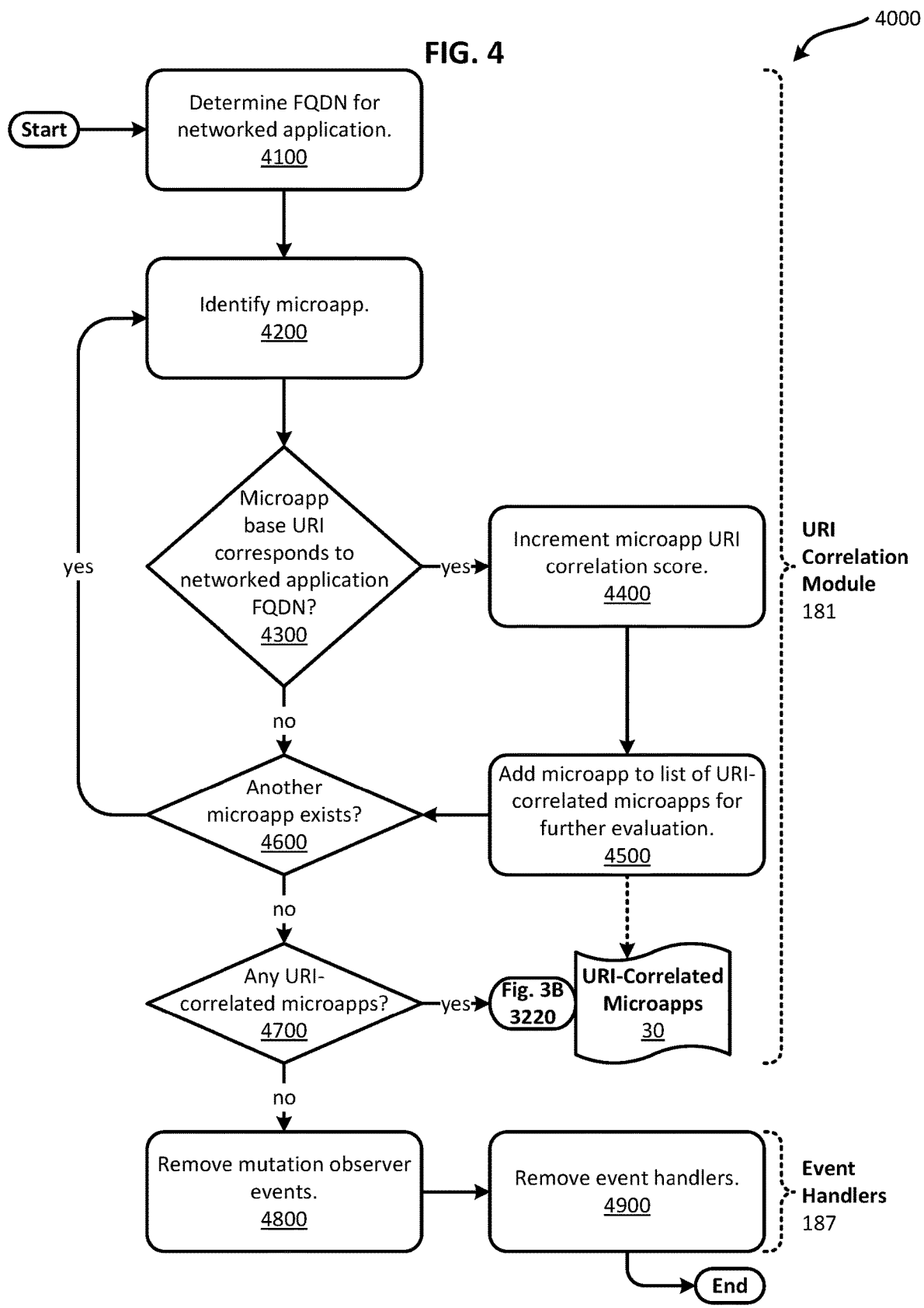
FIG. 4 is a flowchart illustrating an example method for evaluating whether a microapp and a networked application use a common URI.

FIG. 4 is a flowchart illustrating an example method 4000 for evaluating whether a microapp and a networked application use a common URI. In certain embodiments at least some of the functionality associated with method 4000 is provided by a dedicated URI correlation module 181 included within correlation observer 180. The evaluation provided by method 4000 is based on a mapping between a particular microapp and a URI that provides functionality to support the microapp actions. Such a mapping will typically be established by an administrator at the time the microapp is created or configured. Method 4000 thus begins by determining a FQDN for the networked application. See reference numeral 4100 in FIG. 4. A FQDN specifies an exact location in the domain name system (DNS) by specifying all domain levels, and typically includes a host name and at least one higher level domain label. Once the FQDN is identified, a microapp is identified. See reference numeral 4200 in FIG. 4. The identified microapp may be one of a plurality of microapps available to the user, for example as specified in microapp metadata 145 retrieved from cloud computing environment 200.

URI correlation module 181 is configured to determine whether a base URI associated with the identified microapp corresponds to the FQDN of the networked application. See reference numeral 4300 in FIG. 4. For example, if the FQDN of the networked application and the base URI associated with the identified microapp are both "issues.example.net", then a correspondence between the networked application and the identified microapp is considered to have been found. In this case, a URI correlation score is incremented. See reference numeral 4400 in FIG. 4. In some applications, an exact correspondence between the FQDN of the networked application and the URI associated with the identified microapp is not required, in which case only a partial overlap results in an incremented URI correlation score. In certain implementations the URI correlation score is a binary measure, and is incremented to a value of one (or any other nonzero value) when the aforementioned correspondence is identified. Other scoring models can be used in other implementations. In general, microapps with a URI correlation score at or above a threshold (for example, one) can be added to a list of URI-correlated microapps 30 that can be further evaluated in subsequent operations. See reference numeral 4500 in FIG. 4.

The disclosed techniques for identifying URI correspondence can be repeated as needed, for example, can be repeated for one or more of a plurality of microapps available to the user. Thus, after it is determined whether a base URI associated with the identified microapp corresponds to the FQDN of the networked application, and after the microapp URI correlation score is incremented if appropriate, it can be determined whether additional microapps exist which have not yet been evaluated. See reference numeral 4600 in FIG. 4. If all available microapps have been evaluated vis-à-vis the FQDN of the networked application, then a subsequent determination is made with respect to whether any URI-correlated microapps have been identified. See reference numeral 4700 in FIG. 4. If so, then a list of URI-correlated microapps 30 can be returned to method 3000 for further evaluation.

Stated alternatively, if networked application SX and microapp MA share a common base URI, then $SX_iMA_j>0$ for all pages i in the networked application SX and all actions j provided by the microapp MA. And if networked application SX and microapp MB do not share a common base URI, then $SX_iMB_j=0$ for all pages i in the networked application SX and all actions j provided by the microapp MB. Likewise if networked application SY and microapp MA do not share a common base URI, then $SY_iMA_j=0$ for all pages i in the networked application SY and all actions j provided by the microapp MA. Microapps with a URI correlation score of zero should not be recommended to the user, and thus such microapps need not be the subject of other correlation evaluations as disclosed herein.

Where no URI-correlated microapps are identified, it can be assumed that no microapps provide functionality associated with the previously launched networked application. In this case the previously initialized mutation observer events can be removed. See reference numeral 4800 in FIG. 4. Likewise, the previously initiated event handlers 187 can be removed as well. See reference numeral 4900 in FIG. 4. However, it will be appreciated that, in general, mutation observers and event handlers can be selectively removed since the user may later navigate to a different webpage to invoke functionality associated with a different networked application. Thus, in some implementations it may be desirable to leave event handlers in place to detect subsequent navigation events, while removing mutation observers since detection of mutation events for the initial networked application would no longer be useful.

Turning again to FIG. 3B, a determination can be made with respect to whether the networked application is still executing. See reference numeral 3220 in FIG. 3B. If not, method 3000 can end since the user will no longer be accessing functionality associated with the networked application. On the other hand, if the networked application continues to execute, the user will interact with a user interface 32 provided by the networked application. See reference numeral 3230 in FIG. 3B. Such user interface can be accessed via resource access application 170, such as an embedded web browser. After such interactions occur, correlation observer 180 identifies a microapp for further evaluation. See reference numeral 3240 in FIG. 3B. In some cases the identified microapp is a URI-correlated microapp 30 as previously identified using method 4000 illustrated in FIG. 4.

Correlation observer 180 is configured to evaluate the correlation between the identified microapp and the networked application user interface 32. See reference numeral 3250 in FIG. 3B. This may involve evaluating one or more correlation metrics including, but not limited to, a title correlation metric, an API correlation metric, and a user interface element correlation metric. Additional or alternative correlation metrics can be used in alternative implementations. Each of these metrics will be described in greater detail in turn, although it should be appreciated that such metrics can be evaluated in any particular order or simultaneously.

Figure 5:
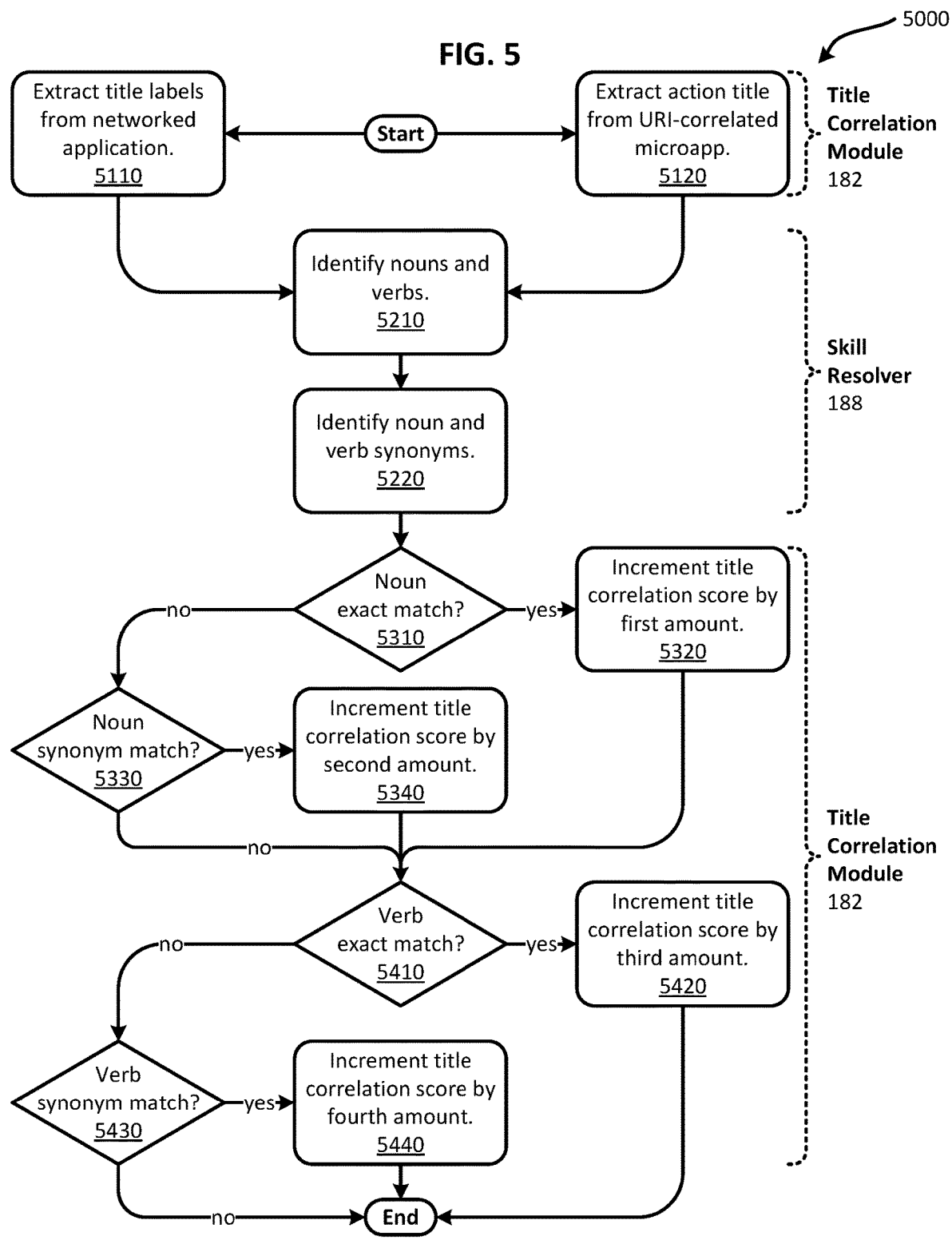
FIG. 5 is a flowchart illustrating an example method for assessing the correlation between action titles used in a microapp and title labels used in a networked application.

FIG. 5 is a flowchart illustrating an example method 5000 for assessing the correlation between action titles used in a microapp and title labels used in a networked application. When a user invokes functionality via a networked application user interface, the title of that user interface provides insight into the invoked functionality. This insight can be used to identify and recommend microapps that provide corresponding functionality. For example, if a user accesses a networked application user interface having title "Request Time Off", these words can be used to identify a microapp providing similar or same functionality as the networked application user interface. A corresponding microapp action might have an action title "Create Time Off Request". Identifying correlations based on user interface title labels advantageously provides a scalable solution that does not require administrator intervention since user interface title labels can be extracted automatically from page metadata. Thus when a new user interface is created new correlations can be identified without requiring manual configuration by an administrator or subject matter expert. While the techniques described herein for assessing title correlation are disclosed in the context of a comparison between a networked application and a microapp, in other implementations these comparisons can also be drawn with respect to other applications such as a desktop application. This would allow correlations to be evaluated between, for example, a desktop application and a microapp.

Method 5000 begins by using title correlation module 182 to extract title labels from a networked application user interface. See reference numeral 5110 in FIG. 5. Title labels can be extracted from page titles and/or user interface dialogue titles. Title labels can be extracted using any suitable technique. For example, in one implementation, a JavaScript element is used to perform such extraction since the JavaScript element would have access to all page elements and underlying page code. An action title label can also be extracted from an identified URI-correlated microapp as well. See reference numeral 5120 in FIG. 5. In certain embodiments the action title label can be extracted from microapp metadata 145 which was received from cloud computing environment 200. The title labels can be extracted from the networked application and the action title labels can be extracted from a URI-correlated microapp simultaneously or in any arbitrary order.

Skill resolver 188 is used to identify nouns and verbs in the extracted title labels and action title labels. See reference numeral 5210 in FIG. 5. Separately identifying nouns and verbs helps to identify user intent and thus helps to more accurately identify microapps that correspond to user intent. Skill resolver 188 can also be used to identify synonyms of the extracted nouns and verbs. See reference numeral 5220 in FIG. 5. Skill resolver 188 may comprise any suitable natural language processing tool that is capable of identifying nouns, verbs, and related synonyms. Continuing with the above example of a networked application user interface having title "Request Time Off", in this case "request" is identified as a verb and "time off" is identified as a noun. Similarly, for the example microapp action having title "Create Time Off Request", the word "create" is identified as a verb and "time off" and "request" are identified as nouns. While identification of nouns and verbs are described in conjunction with the illustrated implementation, other parts of speech can be identified in other implementations.

In general, the greater the match between nouns and verbs in the networked application title labels and the microapp action title labels, the greater the correlation between the networked application and the microapp. In addition, in certain applications noun matches have been found to evince greater correlation than verb matches. Likewise, exact matches (of nouns or verbs) have been found to evince greater correlation than synonym matches. To provide another example, consider a networked application title label "View Time Off". If this networked application title label were compared with microapp action titles "Create Time Off" and "View Time Off", the latter would be considered to have a higher correlation since it provides both a noun and verb match, whereas the "Create Time Off" provides only a noun match ("time off").

Referring again to FIG. 5, title correlation module 182 can be configured to determine whether an exact noun match is identified. See reference numeral 5310 in FIG. 5. If an exact noun match is identified, a title correlation score for the microapp is incremented by a first amount. See reference numeral 5320 in FIG. 5. If an exact noun match cannot be identified, it is determined whether a noun synonym match can be identified. See reference numeral 5330 in FIG. 5. If a noun synonym match can be identified, the title correlation score is incremented by a second amount. See reference numeral 5340 in FIG. 5. In certain implementations, the first amount is greater than the second amount, reflecting that an exact match is indicative of a closer correlation than a synonym match.

Title correlation module 182 is further configured to determine whether an exact verb match is identified. See reference numeral 5410 in FIG. 5. If an exact verb match is identified, a title correlation score for the microapp is incremented by a third amount. See reference numeral 5420 in FIG. 5. If an exact verb match cannot be identified, it is determined whether a verb synonym match can be identified. See reference numeral 5430 in FIG. 5. If a verb synonym match can be identified, the title correlation score is incremented by a fourth amount. See reference numeral 5440 in FIG. 5. In certain implementations, the third amount is greater than the fourth amount, reflecting that an exact match is indicative of a closer correlation than a synonym match.

Likewise, in certain implementations the first and second amounts are greater than or equal to the third and fourth amounts, respectively, reflecting that a noun match is indicative of a closer correlation that a verb match. Other values and relationships between values can be used in other embodiments. For example, in one implementation an exact noun match and an exact verb match result in a title correlation score of 1.0, while an exact noun match alone yields a title correlation score of 0.9 and an exact verb match alone yields a title correlation score of 0.8. In another implementation an exact noun match yields a title correlation score of 0.9 while a noun synonym match yields a title correlation score of 0.85. In still other embodiments, the first, second, third, and fourth amounts are all equal. In addition, the title correlation evaluation method 5000 illustrated in FIG. 5 can be applied to more than one field, such that one or more of user interface element labels, page title labels, and dialog box labels can be analyzed. In some implementations the title correlation score is normalized to a range between 0.0 and 1.0, while in other implementations title correlation scores greater than 1.0 are possible. In general, the larger the number of fields where correlated terms are identified, the greater the resulting correlation between the associated networked application and microapp action.

Referring again to FIG. 3B, correlation observer 180 can be configured to evaluate the correlation between the commands that a networked application invokes and the commands that a URI-correlated microapp invokes. In general, microapp actions typically use an API from a corresponding enterprise application. This API will typically be defined upon creation or configuration of the microapp. For example, a "Create Time Off" microapp action may call an API path "https://example.com/API/benefits". A networked application may use this same API path to invoke related actions. For example, to view accrued time off in a networked application, the same API may be called to invoke a command using the verb GET. In this example, the command uses verb GET and the object of the command is "time off". As another example, to submit a time off request in a networked application, the same API may be called to invoke a command using the verb POST. In this example, the command uses verb POST and the object of the command is "time off". While the techniques described herein for assessing command type correlation are disclosed in the context of a comparison between a networked application and a microapp, in other implementations these comparisons can also be drawn with respect to other applications such as a desktop application. This would allow correlations to be evaluated between, for example, a desktop application and a microapp.

In general, when a user accesses a particular user interface in a networked application that invokes a command to "view" certain data (for example, "view time off"), it is possible to set a zero-value correlation score for microapp actions that use command type POST, and to set a nonzero correlation score for microapp actions that use command type GET. Likewise, when a user accesses a particular user interface in a networked application that invokes a command to "submit" certain data (for example, "request time off"), it is possible to set a zero-value correlation score for microapp actions that use command type GET, and to set a nonzero correlation score for microapp actions that use command type POST. These inferences can be expanded through the use of synonyms for the command terms "view" and "submit". For example, commands that use related terms like "display" and "show" can also be associated with microapp actions that use command type GET. And commands that use related terms like "create", "new", "change", or "enroll" can also be associated with microapp actions that use command type POST. In alternative implementations terms identifying a networked application page title can optionally be correlated with microapp action commands as well.

Figure 6:
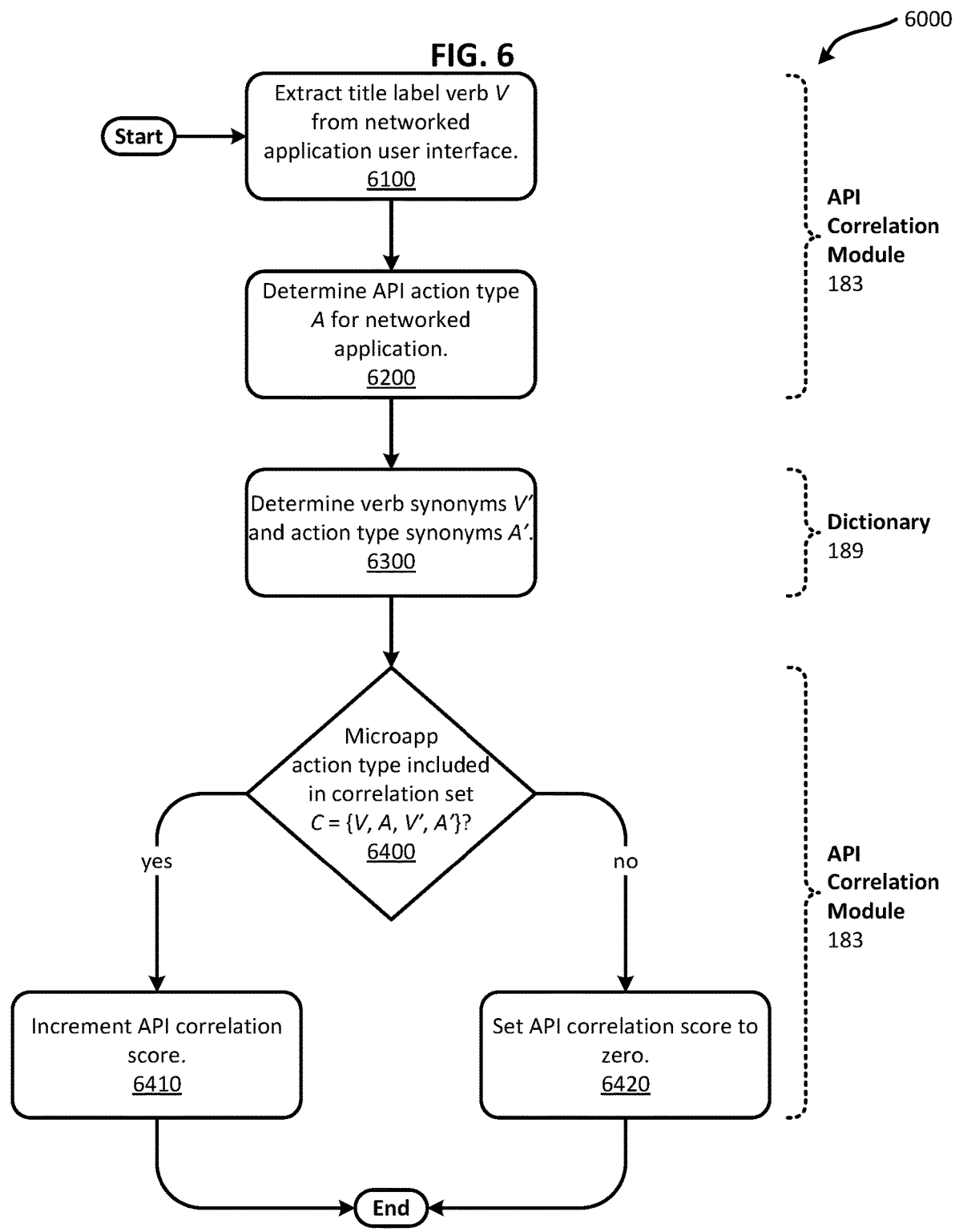
FIG. 6 is a flowchart illustrating an example method for assessing the correlation between actions invoked by a microapp API and actions invoked by a networked application.

FIG. 6 is a flowchart illustrating an example method 6000 for assessing the correlation between actions invoked by a microapp API and actions invoked by a networked application. Method 6000 begins with API correlation module 183 extracting a title label verb V from a networked application user interface. See reference numeral 6100 in FIG. 6. API correlation module 183 can also be configured to determine an API action type A for the networked application. See reference numeral 6200 in FIG. 6. In certain embodiments only the title label verb V is considered in identifying related microapps, in certain embodiments only the API action type A is considered, and in still other embodiments both the title label verb V and the API action type A are considered. Dictionary 189 is optionally used to identify verb synonyms V' and action type synonyms A'. See reference numeral 6300 in FIG. 6. The title label verb V, the action type A, the verb synonyms V', and the action type synonyms A' form a correlation set C={V, A, V', A'}. Any suitable synonym processor can be used to determine the synonyms V' and A'.

API correlation module 183 is configured to determine whether an identified microapp has an action type included in the correlation set C={V, A, V', A'}. See reference numeral 6400 in FIG. 6. That is, for a given microapp it is determined whether that microapp uses an action type corresponding to a title label verb (or its synonyms) associated with the networked application or an API action type (or its synonyms) associated with the networked application. If so, an API correlation score for that microapp can be incremented. See reference numeral 6410 in FIG. 6. Otherwise, the API correlation score for that microapp can be set to have a zero value. See reference numeral 6420 in FIG. 6. In certain implementations the API correlation score is a binary measure, and is incremented to a value of one (or any other nonzero value) when the aforementioned correspondence is identified. Other scoring models can be used in other implementations. The disclosed techniques for identifying API action correspondence can be repeated as needed, for example, can be repeated for one or more of a plurality of URI-correlated microapps available to the user.

In some applications, a user interface of a network application that does not provide any web form or other user interface input elements should not be correlated with microapps with POST actions. In this case, for a networked application that does not provide any web form or other user interface input elements, microapps with POST actions are assigned a API correlation score of zero.

Turning again to FIG. 3B, correlation observer 180 can be configured to evaluate the correlation between user interface elements appearing in a networked application interface and the user interface elements appearing in a microapp interface. This user interface element correlation can be based on one or more of element label correlations, element value type correlations, and/or element value correlations. For example, a user interface element that comprises a drop-down menu allowing the user to select "male" or "female" might have a label "Sex", a value type "list" and a value consisting of the set {"male"; "female"}. If user interface elements in both a networked application interface and a microapp interface contain matching label, value type, and/or value parameters, this suggests a relatively higher correlation than if such correlations did not exist. While the techniques described herein for assessing user interface element correlation are disclosed in the context of a comparison between a networked application and a microapp, in other implementations these comparisons can also be drawn with respect to other applications such as a desktop application. This would allow correlations to be evaluated between, for example, a desktop application and a microapp.

Figure 7:
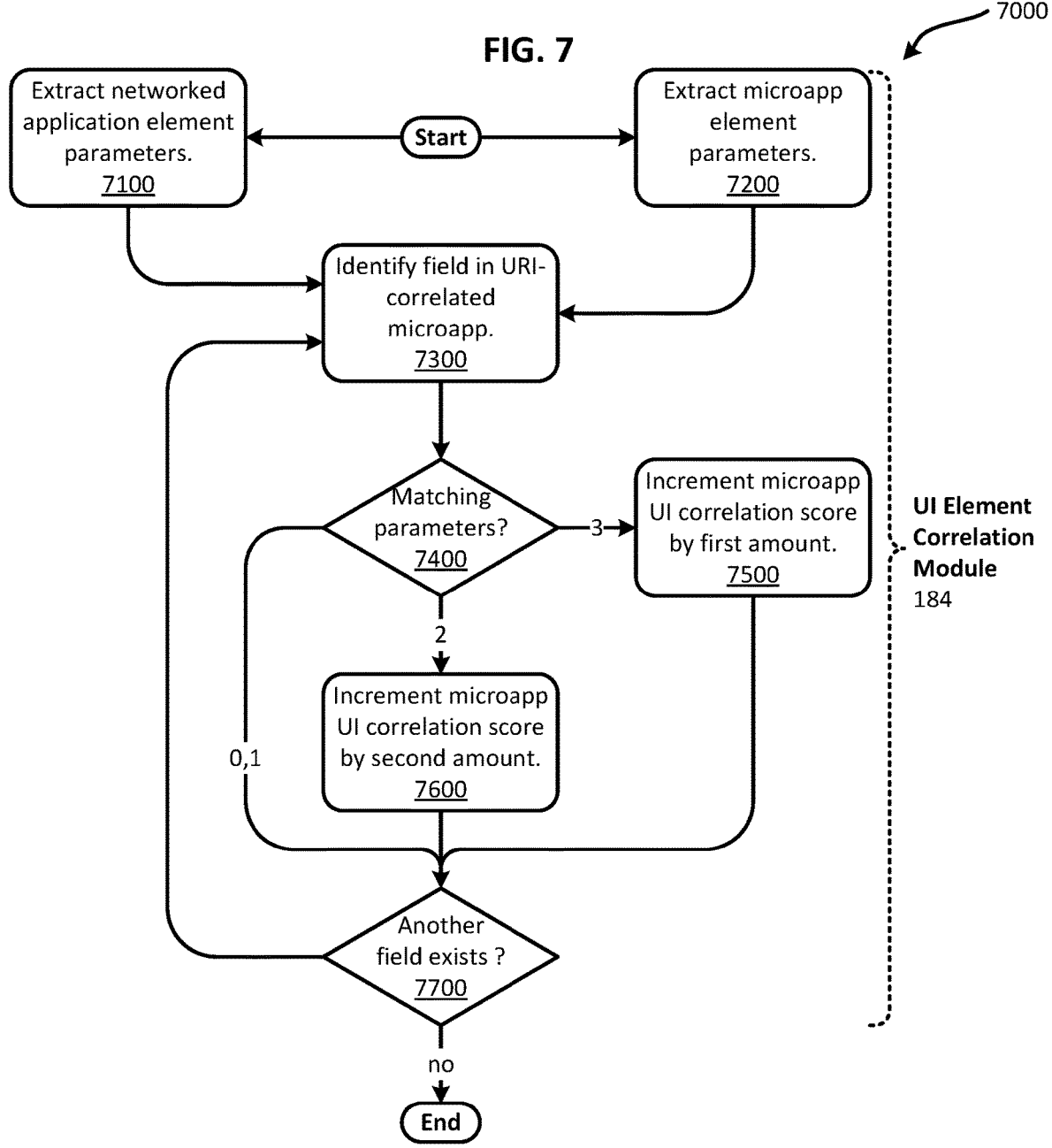
FIG. 7 is a flowchart illustrating an example method for assessing the correlation between user interface elements presented by a microapp and user interface elements presented by a networked application.

FIG. 7 is a flowchart illustrating an example method 7000 for assessing the correlation between user interface elements presented by a microapp and user interface elements presented by a networked application. Method 7000 begins with user interface element correlation module 184 extracting user interface element parameters from a networked application user interface. See reference numeral 7100 in FIG. 7. These parameters can be extracted using any suitable technique. For example, in one implementation a JavaScript element is used to perform such extraction since the JavaScript element would have access to all page elements and underlying page code. User interface element parameters can also be extracted from an identified URI-correlated microapp as well. See reference numeral 7200 in FIG. 7. In certain embodiments the user interface element parameters can be extracted from microapp metadata 145 which was received from cloud computing environment 200. The user interface element parameters can be extracted from the networked application and the URI-correlated microapp simultaneously or in any arbitrary order (for example, networked application extraction first or microapp extraction first).

Figure 8:
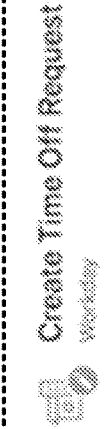
FIG. 8 is a screenshot illustrating an example microapp user interface with extracted label, value type, and value parameters listed in an adjacent table for certain user interface elements.

FIG. 8 is a screenshot illustrating an example microapp user interface 40 with extracted label, value type, and value parameters listed in an adjacent table for certain user interface elements. For example, user interface element 41 is labeled "My Time Off Balance" and has a value type of "table". User interface element 42 is labeled "Time Off Type", has a value type of "list", and has a value consisting of the set {"Floating Holiday"; "CDI/VOL Time"; "PTO (Paid Time Off Days)"}. User interface element 43 is labeled "From" and has a value type of "date". User interface element 44 is labeled "To" and has a value type of "date". User interface element 45 is labeled "Quantity" and has a value type of "numeric". User interface element 46 is labeled "Comment" and has a value type of "string". These are examples of user interface element parameters which can be extracted from a microapp user interface. Additional or alternative parameters may be extracted in other implementations.

FIG. 9 is a screenshot illustrating an example networked application user interface 50 with extracted label, label type, and value parameters listed in an adjacent table for certain user interface elements. For example, user interface element 51 is labeled "When" and has a value type of "string with dates". User interface element 52 is labeled "Type", has a value type of "HTML list", and has a value consisting of the set {"Floating Holiday"; "CDI/VOL Time"; "PTO (Paid Time Off Days)"}. User interface element 53 is labeled "Daily Quantity" and has a value type of "numeric". User interface element 54 is labeled "Unit of Time" and has a value type of "numeric". User interface element 55 is labeled "Comments" and has a value type of "string". User interface element 56 is labeled "Attachment" and has a value type of "file". These are examples of user interface element parameters which can be extracted from a networked application user interface. Additional or alternative parameters may be extracted in other implementations.

Referring again to FIG. 7, user interface element correlation module 184 is further configured to identify a field in a particular microapp. See reference numeral 7300 in FIG. 7. It is then determined whether that field has matching parameters in the networked application user interface that the user has invoked, and if so, how many matching parameters. See reference numeral 7400 in FIG. 7. Microapps often have more focused functionality than networked applications, and therefore microapp user interfaces often have a smaller number of elements as compared to a networked application user interface. If two interfaces have user interface elements which are closely correlated, then it suggests that the corresponding networked application and microapp have a close correlation. A pair of user interface elements can be considered to be closely correlated when they include multiple parameters that closely or exactly match each other. Thus a user interface correlation score can be calculated based on the extent to which pairs of user interface elements have matching parameters. In one implementation the considered parameters are element label name, element value type, and element value. Other parameters can be considered in other implementations.

Referring again to the example user interfaces illustrated in FIGS. 8 and 9, a table is illustrated next to each user interface listing the various fields and their parameters. FIG. 10 is a side-by-side view of the tables of FIGS. 8 and 9 with matching parameters indicated. FIG. 10 illustrates one pair of fields—element 42 in FIG. 8 ("Time Off Type") and element 52 in FIG. 9 ("Type")—having three matching parameters. These three matching parameters are label ("Type Off Type" compared with "Type", which is an overlapping match), value type ("list" compared with "HTML list", which is an overlapping match), and value (an exact match of the set {"Floating Holiday"; "CDI/VOL Time"; "PTO (Paid Time Off Days)"}). The existence of three matching parameters suggests a close correlation between the two user interfaces, and in particular, the presence of a matching drop down menu selection list is a strong indication of a close correlation.

FIG. 10 also illustrates that two other pairs of fields have two matching parameters. Specifically, element 45 in FIG. 8 ("Quantity") and element 53 in FIG. 9 ("Daily Quantity") have two matching parameters: "Quantity" compared with "Daily Quantity", which is an overlapping match; and value type "numeric", which is an exact match. And element 56 in FIG. 8 ("Comment") and element 55 in FIG. 9 ("Comment") have exact matches in both label ("Comment") and value type ("string"). The existence of two matching parameters also suggests a close correlation between the two user interfaces, although to a lesser degree than the aforementioned three matching parameters. In general, the more fields that have matching parameters between a microapp user interface and a networked application user interface, the higher the user interface correlation score will be.

Referring again to FIG. 7, if the identified field in the URI-correlated microapp has three matching parameters, then the microapp user interface correlation score is incremented by a first amount. See reference numeral 7500 in FIG. 7. If the identified field in the URI-correlated microapp has two matching parameters, then the microapp user interface correlation score is incremented by a second amount. See reference numeral 7600 in FIG. 7. If the identified field in the URI-correlated microapp has one or zero matching parameters, then the microapp user interface correlation score is not incremented. In certain implementations the first amount is greater than the second amount in recognition of the fact that more matching fields indicate a greater correlation between user interfaces. Other scoring models can be used in other embodiments, including a model wherein the first and second amounts are equal, or a model wherein the user interface correlation score is incremented in response to the presence of only a single matching parameter. Regardless of the particular scoring model used, after the user interface correlation score is incremented as appropriate, if at all, a determination is made with respect to whether additional fields exist in the URI-correlated microapp. See reference numeral 7700 in FIG. 7. If so, the additional fields can be evaluated similarly. If not, an overall recommendation score for the microapp can be determined.

Turning again to FIG. 3B, once title correlations, API correlations, and user interface element correlations are evaluated, correlation observer 180 can be configured to determine whether another microapp exists. See reference numeral 3260 in FIG. 3B. The various correlations disclosed herein can be evaluated for multiple microapps, for example for the multiple microapps in the set of URI-correlated microapps 30. In other implementations the various correlations disclosed herein can be evaluated for multiple microapps regardless of whether URI correlation is present. In any event, once a collection of microapps have been evaluated, correlation observer can be configured to determine an aggregate correlation score for each evaluated microapp. See reference numeral 3310 in FIG. 3C. An aggregate correlation score is also referred to as a composite correlation score.

As disclosed herein, comparing a networked application user interface to a given microapp may result in multiple correlation scores, including for example a URI correlation score, a title correlation score, an API correlation score, and a user interface element correlation score. Certain of these scores may be binary scores, that is, have a value of either 0 or 1. These scores can be combined to produce an aggerate correlation score. In particular, if page i of networked application SX is compared with action j provided by microapp MA, then an aggregate correlation score $SX_iMA_j$ can be calculated as $SX_iMA_j=(\frac{1}{4})\times(aU+bT+cA+dE)$, where U is a URI correlation score, T is a title correlation score, A is an API correlation score, and E is a user interface element correlation score. The scalar parameters a, b, c, and d are coefficients that can be adjusted to manipulate the weight attributed to the different correlations. For example, in one implementation d is given a higher value than the other parameters in recognition of the fact that, in certain applications, user interface element correlation is more strongly indicative of equivalent functionality. In one embodiment $a+b+c+d=1$.

Once an aggregate correlation score is determined for the evaluated microapps, correlation observer 180 can be configured to determine whether any of the evaluated microapps have an aggregate correlation score greater than a specified threshold minimum threshold T. See reference numeral 3320 in FIG. 3C. In some application T can be hardcoded to equal zero, although in other cases the value of T is administrator-configurable, and optionally set to zero as default. If no evaluated microapps have an aggregate correlation score greater than zero, this suggests that no microapp exists that provides sufficiently similar functionality as the networked application user interface with which the user is interacting. In this case, further observation of the user's interactions with the networked application can be undertaken. See reference numeral 3220 in FIG. 3B. On the other hand, if at least one evaluated microapp has an aggregate recommendation score greater than zero, then at least one microapp can be recommended to the user. In alternative implementations a threshold minimum aggregate correlation score that is greater than zero is applied.

Where there is at least one evaluated microapp to be recommended to the user, an end timestamp is set. See reference numeral 3330 in FIG. 3C. The end timestamp can be used to calculate recommendation metrics for a generated microapp recommendation, as will be described in turn. Recommendation engine 190 can be configured to identify one or more recommended microapps and associated recommendation metrics. See reference numeral 3340 in FIG. 3C. Recommendation metrics quantify productivity time savings or overall productivity insights that can help motivate the user to adopt a recommendation. An example recommendation metric that is individually tailored might indicate: "It took you twenty seconds to submit your vacation request. Users who submitted a vacation request using the recommended microapp accomplished the same operation in seven seconds." An example recommendation metric that provides an overall productivity insight might indicate: "395 users who have used the recommended microapp have saved 33 hours as a result of doing so." Metrics such as these can be calculated on the basis of the start and end timestamps recorded by correlation observer 180 as well as on the basis of microapp metadata retrieved from cloud computing environment 200. In alternative implementations recommendation metrics are not calculated, and thus setting the start and end timestamps can be omitted.

Recommendation engine 190 is optionally configured to display one or more microapp recommendations via user interface 160. See reference numeral 3350 in FIG. 3C. In some implementations only a single highest-ranked recommendation is displayed while in other implementations a list of the N highest-ranked recommendations is displayed, wherein N is an integer greater than or equal to two. The recommendation is optionally displayed via an interface that is provided as the user interacts with the networked application, such as in a popup window. Recommendations may be especially efficient and effective when presented as an improved solution to the user's immediate task at hand. The recommendation interface optionally includes a link to download, install, or otherwise accept a given microapp recommendation. After the recommendation is displayed in user interface 160, the user's interactions with the networked application can continue to be monitored in the event that additional recommendations can be made. See reference numeral 3220 in FIG. 3B.

Conclusion

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims. In addition, the phraseology and terminology used herein is for the purpose of description and should not be regarded as limiting. Any references to examples, components, elements, or acts of the systems and methods herein referred to in the singular can also embrace examples including a plurality, and any references in plural to any example, component, element, or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms.

What is claimed is:

1. A system that comprises a client computing device that includes a memory and at least one processor coupled to the memory, wherein the client computing device is configured to generate a microapp recommendation by a recommendation process comprising:
   receiving, at the client computing device, microapp metadata that characterizes a plurality of microapps;
   using a resource access application executing at the client computing device to launch a networked application that displays a user interface at the client computing device;
   calculating a composite correlation score for a particular one of the microapps, wherein the composite correlation score quantifies correlation between functionality provided by the user interface of the networked application and functionality provided by the particular microapp;
   using the composite correlation score to make a determination with respect to whether the particular microapp should be recommended to a user of the client computing device; and
   in response to determining that the particular microapp should be recommended to the user of the client computing device, displaying a supplemental user interface that provides a recommendation for the particular microapp.

2. The system of claim 1, wherein:
   a plurality of composite correlation scores are calculated, each calculated composite correlation score quantifying correlation between functionality provided by the user interface of the networked application and functionality provided by a corresponding one of the microapps;
   the plurality of composite correlation scores are used to make a determination that more than one microapp should be recommended to the user; and
   a ranked list of recommended microapps are displayed in the supplemental user interface.

3. The system of claim 1, wherein calculating the composite correlation score for the particular microapp comprises determining a weighted sum of one or more of a title correlation score, an application programming interface correlation score, or a user interface element correlation score.

4. The system of claim 1, the recommendation process further comprising:
   determining a first time that the user spends performing a task using the user interface of the networked application;
   determining a second time associated with performing a corresponding task using the particular microapp; and
   displaying, in the supplemental user interface, a relative comparison of the first and second times in conjunction with the recommendation of the particular microapp.

5. The system of claim 1, wherein a plurality of composite correlation scores are calculated, each calculated composite correlation score quantifying correlation between functionality provided by the user interface of the networked application and functionality provided by a corresponding one of the microapps.

6. The system of claim 1, wherein the composite correlation score for the particular microapp depends on a uniform resource identifier (URI) correlation score that is established by a URI correlation score process comprising:
   determining a fully qualified domain name (FQDN) for the networked application;
   determining a base URI for the particular microapp;
   setting the URI correlation score to a nonzero value if the FQDN for the networked application corresponds to the base URI of the particular microapp; and
   setting the URI correlation score to zero if the FQDN for the networked application does not correspond to the base URI of the particular microapp.

7. The system of claim 6, the recommendation process further comprising, in response to setting the URI correlation score to zero, making a determination that the particular microapp should not be recommended to the user of the client computing device.

8. The system of claim 6, wherein the FQDN of the networked application is considered to correspond to the base URI of the particular microapp when at least a portion of the base URI of the particular microapp is included in the FQDN of the networked application.

9. The system of claim 1, wherein the composite correlation score for the particular microapp depends on a title correlation score that is established by a title correlation score process comprising:
identifying one or more first terms used in a title label associated with the user interface displayed by the networked application;
identifying one or more second terms used in an action title label associated with the particular microapp; and
incrementing the title correlation score by a first amount in response to at least one of the one or more first terms exactly matching at least one of the one or more second terms.

10. The system of claim 9, the title correlation score process further comprising:
identifying one or more first synonyms for at least one of the one or more first terms;
identifying one or more second synonyms for at least one of the one or more second terms; and
incrementing the title correlation score by a second amount in response to one or more of the first synonyms matching one or more of the second synonyms;
wherein the first amount is greater than the second amount.

11. The system of claim 9, wherein:
the title correlation score is incremented by the first amount when the at least one of the first terms that exactly matches the at least one of the second terms is a noun;
the title correlation score is incremented by a second amount when the at least one of the first terms that exactly matches the at least one of the second terms is a verb; and
the first amount is greater than the second amount.

12. The system of claim 1, wherein the composite correlation score for the particular microapp depends on an application programming interface (API) correlation score that is established by an API correlation score process comprising:
identifying one or more API action types invoked by the networked application;
identifying one or more commands invoked by the particular microapp; and
incrementing the API correlation score by a first amount in response to at least one of the API action types corresponding to at least one of the commands invoked by the particular microapp.

13. The system of claim 12, wherein:
the one or more API action types are selected from a group consisting of "create", "new", "change", and "enroll"; and
the one or more commands invoked by the particular microapp are of command type POST.

14. The system of claim 12, the API correlation score process further comprising:
identifying one or more synonyms for at least one of the one or more API action types; and
incrementing the API correlation score by a second amount in response to at least one of the synonyms corresponding to at least one of the commands invoked by the particular microapp;
wherein the first amount is greater than the second amount.

15. The system of claim 1, wherein the composite correlation score of the particular microapp depends on a user interface element correlation score that is established by a user interface element correlation score process comprising:
identifying first parameters that characterize an element that forms part of the user interface displayed by the networked application;
identifying second parameters that characterize a user interface element displayed by the particular microapp; and
incrementing the user interface element correlation score in response to a plurality of the first parameters corresponding to a plurality of the second parameters.

16. The system of claim 15, wherein the first and second parameters each include at least one of a label parameter, a value type parameter, or a value parameter.

17. The system of claim 15, wherein:
the user interface element correlation score is incremented by a first amount in response to two of the first parameters corresponding to two of the second parameters;
the user interface element correlation score is incremented by a second amount in response to more than two of the first parameters corresponding to more than two of the second parameters; and
the second amount is greater than the first amount.

18. A method for generating a microapp recommendation, the method comprising:
receiving, at a client computing device, microapp metadata that characterizes a plurality of micro apps;
using a resource access application executing at the client computing device to launch a networked application that displays a user interface at the client computing device;
calculating a composite correlation score for a particular one of the microapps, wherein the composite correlation score quantifies correlation between functionality provided by the user interface of the networked application and functionality provided by the particular microapp;
using the composite correlation score to make a determination with respect to whether the particular microapp should be recommended to a user of the client computing device; and
in response to determining that the particular microapp should be recommended to the user of the client computing device, displaying a supplemental user interface that provides a recommendation for the particular microapp.

19. The method of claim 18, wherein the composite correlation score for the particular microapp depends on a title correlation score that is established by a title correlation score process comprising:
identifying one or more first terms used in a title label associated with the user interface displayed by the networked application;
identifying one or more second terms used in an action title label associated with the particular microapp; and
incrementing the title correlation score by a first amount in response to at least one of the one or more first terms exactly matching at least one of the one or more second terms.

20. The method of claim 18, wherein the composite correlation score for the particular microapp depends on an application programming interface (API) correlation score that is established by an API correlation score process comprising:
identifying one or more API action types invoked by the networked application;
identifying one or more commands invoked by the particular microapp; and incrementing the API correlation score by a first amount in response to at least one of the API action types corresponding to at least one of the commands invoked by the particular microapp.

21. The method of claim 18, wherein the composite correlation score of the particular microapp depends on a user interface element correlation score that is established by a user interface element correlation score process comprising:
identifying first parameters that characterize an element that forms part of the user interface displayed by the networked application;
identifying second parameters that characterize a user interface element displayed by the particular microapp; and
incrementing the user interface element correlation score in response to a plurality of the first parameters corresponding to a plurality of the second parameters.

22. A non-transitory computer readable medium storing processor-executable instructions to generate a microapp recommendation, the processor-executable instructions comprising instructions to:
receive, at a client computing device, microapp metadata that characterizes a plurality of micro apps;
use a resource access application executing at the client computing device to launch a networked application that displays a user interface at the client computing device;
calculate a composite correlation score for a particular one of the microapps, wherein the composite correlation score quantifies correlation between functionality provided by the user interface of the networked application and functionality provided by the particular microapp;
use the composite correlation score to make a determination with respect to whether the particular microapp should be recommended to a user of the client computing device; and
in response to determining that the particular microapp should be recommended to the user of the client computing device, display a supplemental user interface that provides a recommendation for the particular microapp.

23. The non-transitory computer readable medium of claim 22, wherein the composite correlation score for the particular microapp depends on a title correlation score that is established by a title correlation score process comprising:
identifying one or more first terms used in a title label associated with the user interface displayed by the networked application;
identifying one or more second terms used in an action title label associated with the particular microapp; and
incrementing the title correlation score by a first amount in response to at least one of the one or more first terms exactly matching at least one of the one or more second terms.

24. The non-transitory computer readable medium of claim 22, wherein the composite correlation score for the particular microapp depends on an application programming interface (API) correlation score that is established by an API correlation score process comprising:
identifying one or more API action types invoked by the networked application;
identifying one or more commands invoked by the particular microapp; and
incrementing the API correlation score by a first amount in response to at least one of the API action types corresponding to at least one of the commands invoked by the particular microapp.

25. The non-transitory computer readable medium of claim 22, wherein the composite correlation score of the particular microapp depends on a user interface element correlation score that is established by a user interface element correlation score process comprising:
identifying first parameters that characterize an element that forms part of the user interface displayed by the networked application;
identifying second parameters that characterize a user interface element displayed by the particular microapp; and
incrementing the user interface element correlation score in response to a plurality of the first parameters corresponding to a plurality of the second parameters.

* * * * *